United States Patent
Baenziger et al.

(10) Patent No.: US 9,202,304 B1
(45) Date of Patent: Dec. 1, 2015

(54) PATH PERFORMANCE MINI-CHARTS

(71) Applicants: Rony R. Baenziger, Palm Coast, FL (US); Hanna Yehuda, Ra'anana (IL); Gary K. Roberts, Lexington, MA (US); JoAnne Hubbard, Concord, MA (US); Mark A. Arakelian, Shirley, MA (US); Katarzyna Leskow, Hanover, MA (US)

(72) Inventors: Rony R. Baenziger, Palm Coast, FL (US); Hanna Yehuda, Ra'anana (IL); Gary K. Roberts, Lexington, MA (US); JoAnne Hubbard, Concord, MA (US); Mark A. Arakelian, Shirley, MA (US); Katarzyna Leskow, Hanover, MA (US)

(73) Assignee: EMC Corporation, Hopkinton, MA (US)

( * ) Notice: Subject to any disclaimer, the term of this patent is extended or adjusted under 35 U.S.C. 154(b) by 145 days.

(21) Appl. No.: 13/629,805

(22) Filed: Sep. 28, 2012

(51) Int. Cl.
  *G06T 11/20* (2006.01)
  *G06T 15/06* (2011.01)

(52) U.S. Cl.
  CPC ..................... *G06T 15/06* (2013.01)

(58) Field of Classification Search
  USPC ......................................................... 345/440
  See application file for complete search history.

(56) References Cited

U.S. PATENT DOCUMENTS

| | | | |
|---|---|---|---|
| 5,206,939 A | 4/1993 | Yanai et al. | |
| 5,226,120 A * | 7/1993 | Brown et al. ................ | 709/224 |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,144,379 A * | 11/2000 | Bertram et al. ............... | 715/835 |
| 6,434,637 B1 | 8/2002 | D'Errico | |
| 6,622,221 B1 | 9/2003 | Zahavi | |
| 7,292,969 B1 | 11/2007 | Aharoni et al. | |
| 7,392,360 B1 | 6/2008 | Aharoni et al. | |
| 7,441,023 B2 | 10/2008 | Benjamin et al. | |
| 7,522,176 B2 * | 4/2009 | Tolle et al. ................... | 345/619 |
| 7,688,753 B1 | 3/2010 | Zimran et al. | |
| 7,720,003 B2 | 5/2010 | Benjamin et al. | |
| 7,779,291 B2 | 8/2010 | Yoder et al. | |
| 7,783,778 B2 | 8/2010 | Benjamin | |
| 8,028,062 B1 | 9/2011 | Wigmore et al. | |
| 8,364,460 B2 * | 1/2013 | Ostermeyer et al. ............. | 703/22 |
| 2005/0108643 A1 * | 5/2005 | Schybergson et al. ......... | 715/713 |
| 2007/0067296 A1 * | 3/2007 | Malloy et al. ..................... | 707/8 |
| 2008/0115049 A1 * | 5/2008 | Tolle et al. ..................... | 715/209 |
| 2009/0282325 A1 * | 11/2009 | Radakovitz et al. .......... | 715/217 |
| 2012/0110460 A1 * | 5/2012 | Wilson .......................... | 715/736 |

(Continued)

OTHER PUBLICATIONS

U.S. Appl. No. 12/807,943, filed Sep. 17, 2010, Colon et al.
U.S. Appl. No. 13/065,806, filed Mar. 30, 2011, Smirnov et al.

(Continued)

*Primary Examiner* — M Good Johnson
(74) *Attorney, Agent, or Firm* — Muirhead and Saturnelli, LLC

(57) ABSTRACT

A system provides for display of results from performance data analysis that presents mini-chart overlays on a topology map based on intelligent analytics for components in a I/O data path of a host or other object. The mini-charts may be advantageously used to show criticality of impact to assist a user with incident avoidance and/or to provide fast incident resolution. When launching into the topology map, the user may enable mini-charts and visually see from the charts where a possible performance bottleneck is detected by the analytics. In an embodiment, the mini-charts for the most relevant metrics may be displayed and identified for criticality, such as by color. The colors may be determined by thresholds, that may be set by a user and/or determined by the system, and may be calculated automatically based on learned base line, maximum line and minimum line operations over set times.

20 Claims, 20 Drawing Sheets

(56) References Cited

U.S. PATENT DOCUMENTS

2013/0019197 A1*  1/2013  Brugler et al. ............. 715/772
2014/0019899 A1*  1/2014  Cheng et al. ............... 715/770

OTHER PUBLICATIONS

U.S. Appl. No. 13/335,316, filed Dec. 22, 2011, Lim et al.
EMC Corporation, "Diagnosing Performance Issues With ProSphere: An Introduction to Use Cases and Architecture," White paper H8935, Sep. 2011, 14 pp.
EMC Corporation, "EMC Symmetrix Storage Management Solution," Data sheet H6194.2, Nov. 2010, 5 pp.
EMC Corporation, "EMC Ionix ControlCenter (formerly EMC ControlCenter) 6.0 StorageScope: Best Practices Planning," White paper H4154, Jun. 2009, 43 pp.
EMC Corporation, "ProSphere Discovery and Monitoring for the Modern Data Center," White paper H8890, Aug. 2011, 17 pp.
EMC Corporation, "ProSphere: Next Generation Storage Resource Management," White paper H8886, Aug. 2011, 13 pp.

* cited by examiner

PATH PERFORMANCE MINI-CHARTS

TECHNICAL FIELD

This application relates to storage area networks and, more particularly, to the field of performance data collection in a storage area network.

BACKGROUND OF THE INVENTION

Host processor systems may store and retrieve data using storage devices (also referred to as storage arrays) containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives.

Characteristics of the storage devices containing the data that has been stored across one or more disk drives and of elements of a storage area network (SAN) coupling the storage devices to one or more hosts may be monitored according to different performance statistics and measures. For example, I/O operations initiated by a host will result in corresponding activity in SAN fabric links, storage array ports and adapters, and storage volumes, measured in I/Os per second and Megabytes per second. Other characteristics may similarly be measured. Such characteristics may be significant factors in managing storage system performance, for example, in analyzing use of lowering access performance versus more expensive higher performance disk drives in a SAN, or by expanding number of SAN channels or channel capacity. Users may balance performance, capacity and costs when considering how and whether to replace and/or modify one or more storage devices or components.

In various circumstances, it may be desirable to collect performance data for objects of a storage system including I/O data paths between one or more hosts and one or more storage devices. Known performance data collection techniques may include a user manually determining and selecting individual managed objects for configuration to collect performance data. For example, when the I/O data paths are changed for the application host, with manual configurations a user would have to determine which managed objects changed within the I/O data paths and update performance data collection jobs accordingly to reflect the changes. Such techniques may be disadvantageously complex and subject to user error. In another example, virtual hosts (e.g., hosts running as guest operating systems or virtual machines (VM's)) may be created in a cluster of physical hosts which rely for I/O transport on previously-created, or dynamically changing, I/O data paths.

Accordingly, it would be desirable to provide a system that may be advantageously used for performance data collection, particularly in connection with the display of the performance data for use in a flexible and efficient manner.

SUMMARY OF THE INVENTION

According to the system described herein, a method for displaying performance data includes generating a mini-chart. The mini-chart corresponds to a full data chart that displays collected performance data for at least one object of an I/O path. The mini-chart is displayed on a topology map showing objects of the I/O path. Selection of the mini-chart is enabled, in which selection of the mini-chart causes display of the full data chart corresponding to the mini-chart. Displaying the mini-chart on the topology map may include assigning a visual designation of the mini-chart according to a criticality determination. The criticality determination may include determining whether a threshold is reached corresponding to the collected performance data. The threshold may be dynamically set over time based on analytics determined from the collected performance data. The visual designation may be a color of a color coded criticality schema. The method may further include generating the topology map, displaying the topology map on a display, and/or collecting the performance data for the at least one object of the data path.

According further to the system described herein, a non-transitory computer readable medium stores software for displaying performance data. The software includes executable code that generates a mini-chart, wherein the mini-chart corresponds to a full data chart that displays collected performance data for at least one object of an I/O path. Executable code is provided that displays the mini-chart on a topology map showing objects of the I/O path. Executable code is provided that enables selection of the mini-chart, wherein selection of the mini-chart causes display of the full data chart corresponding to the mini-chart. The executable code that displays the mini-chart on the topology map may include executable code that assigns a visual designation of the mini-chart according to a criticality determination. The criticality determination may include determining whether a threshold is reached corresponding to the collected performance data. The threshold may be dynamically set over time based on analytics determined from the collected performance data. The visual designation may be a color of a color coded criticality schema. The software may further include executable code that generates the topology map, executable code that displays the topology map on a display, and/or executable code that collects the performance data for the at least one object of the data path.

According further to the system described herein, a system for displaying performance data includes a display and a performance data collection tool that collects performance data for at least one object of an I/O data path. A non-transitory computer readable medium stores software, executed by at least one processor, for displaying performance data. The software includes executable code that generates a mini-chart, wherein the mini-chart corresponds to a full data chart that displays collected the performance data for the at least one object of the I/O path. Executable code is provided that displays the mini-chart on a topology map showing objects of the I/O path. Executable code is provided that enables selection of the mini-chart, wherein selection of the mini-chart causes display of the full data chart corresponding to the mini-chart. The executable code that displays the mini-chart on the topology map may include executable code that assigns a visual designation of the mini-chart according to a criticality determination. The criticality determination may include determining whether a threshold is reached corresponding to the collected performance data. The threshold may be dynamically set over time based on analytics determined from the collected performance data. The visual designation may be a color of a color coded criticality schema. The software may further include executable code that generates the topology map and/or executable code that displays the topology map on the display.

BRIEF DESCRIPTION OF THE DRAWINGS

Embodiments of the system are described with reference to the several figures of the drawings, which are briefly described as follows.

DETAILED DESCRIPTION OF VARIOUS EMBODIMENTS

Figure 1:
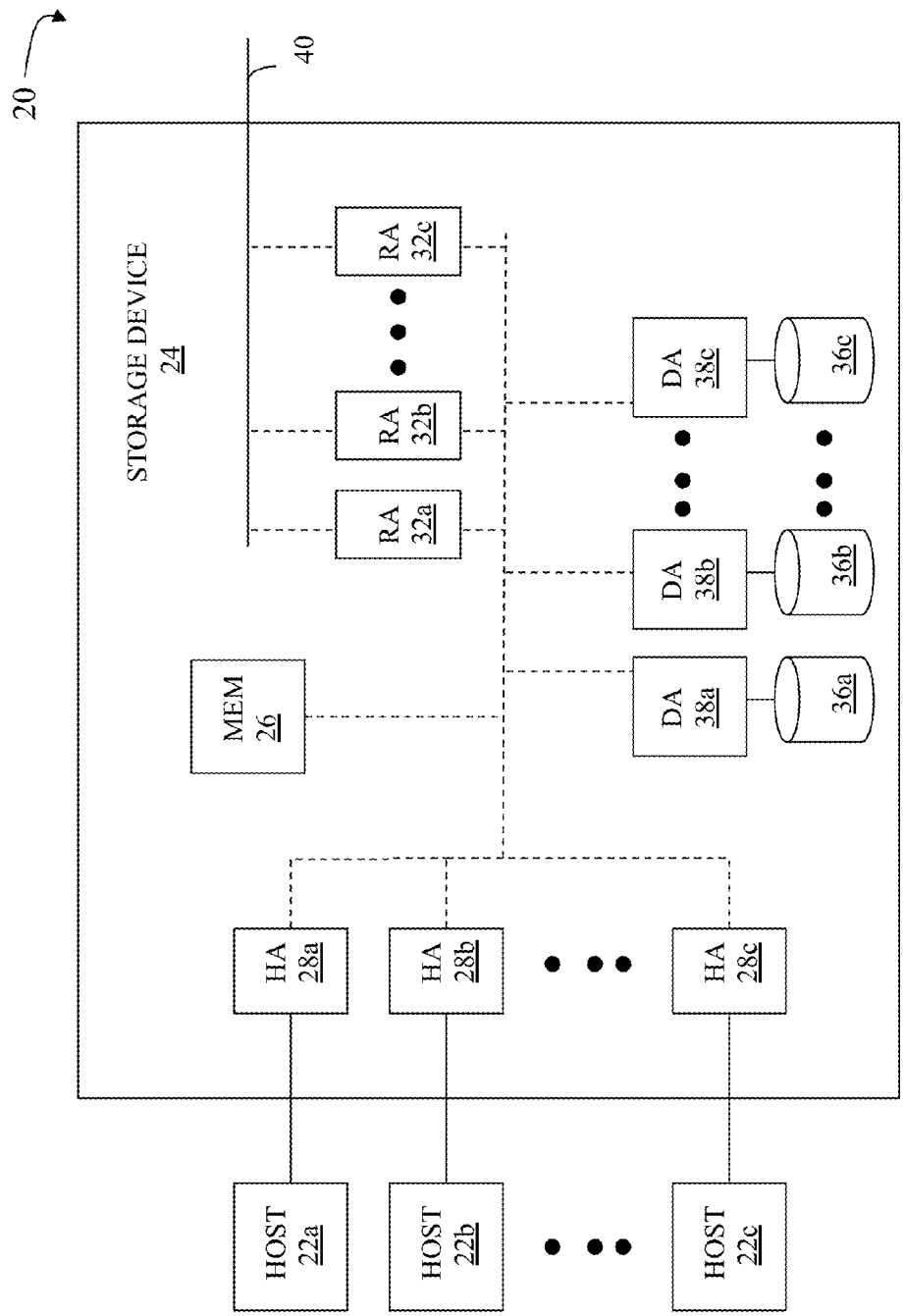
FIG. 1 is a schematic diagram showing a plurality of hosts and a data storage device that may be used in connection with the system described herein.

FIG. 1 is a schematic diagram 20 showing a plurality of hosts 22a-22c coupled to a data storage device 24 that may be used in connection with an embodiment of the system described herein. The data storage device 24 includes a memory 26 that facilitates operation of the storage device 24, as further described elsewhere herein. The data storage device also includes a plurality of host adapters (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts. In an embodiment, the storage device 24 may be a Symmetrix storage device and/or a CLARiiON storage device produced by EMC Corporation of Hopkinton, Mass.

In an embodiment, the storage device 24 may include one or more remote adapter units (RA's) 32a-32c. An RA may be used, for example, in connection with a remote data facility (RDF) product produced by EMC Corporation, may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to a remote link 40 and are similar to the HA's 28a-28c, but are used to transfer data between the storage device 24 and other storage devices that are also coupled to the remote link 40. The storage device 24 may be coupled to additional RDF links (not shown) in addition to the remote link 40. For further discussion of RDF and the use thereof in data recovery and storage techniques, see, for example, U.S. Pat. No. 5,742,792 to Yanai, et al., entitled "Remote Data Mirroring" and U.S. Pat. No. 7,779,291 to Yoder et al., entitled "Four Site Triangular Asynchronous Replication," which are incorporated herein by reference.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail. The storage device 24 may be provided as a stand-alone device coupled to the hosts 22a-22c as shown in FIG. 1 or, alternatively, the storage device 24 may be part of, and/or otherwise coupled to, a storage area network (SAN) that may include a plurality of other storage devices as well as switches, routers, network connections, etc., as further discussed elsewhere herein.

Figure 2:
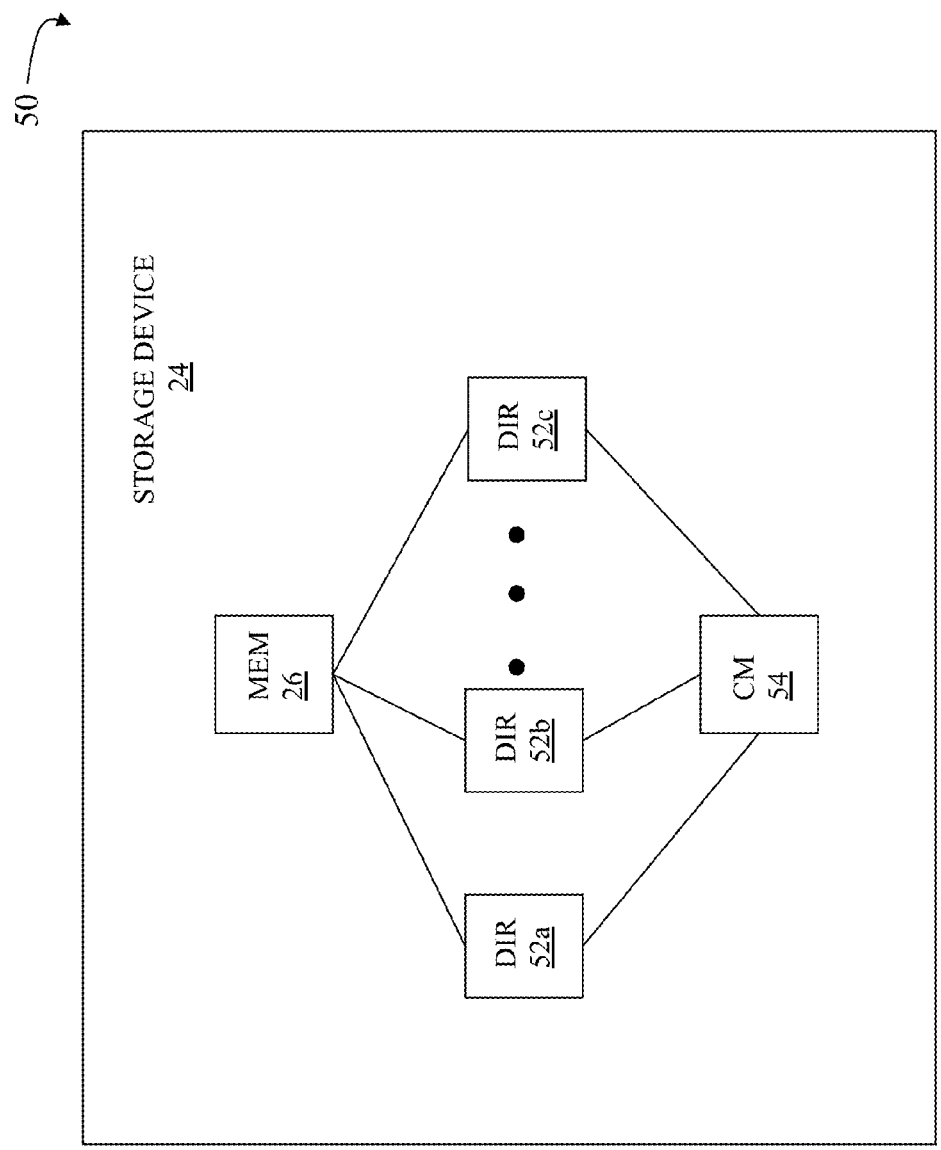
FIG. 2 is a schematic diagram showing a storage device, memory, a plurality of directors, and a communication module that may be used in connection with the system described herein.

FIG. 2 is a schematic diagram 50 illustrating an embodiment of the storage device 24 where each of a plurality of directors 52a-52c are coupled to the memory 26. Each of the directors 52a-52c may represent one of the HA's 28a-28c, RA's 32a-32c, and/or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage device and accessible by each of the storage devices.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host devices with one or more storage devices in a manner that allows reconfiguring connections without having to physically disconnect and reconnect cables from and to ports of the devices. A storage area network may be implemented using one or more switches to which the storage devices and the host devices are coupled. The switches may be programmed to allow connections between specific ports of devices coupled to the switches. A port that can initiate a data-path connection may be called an "initiator" port while the other port may be deemed a "target" port.

Figure 3:
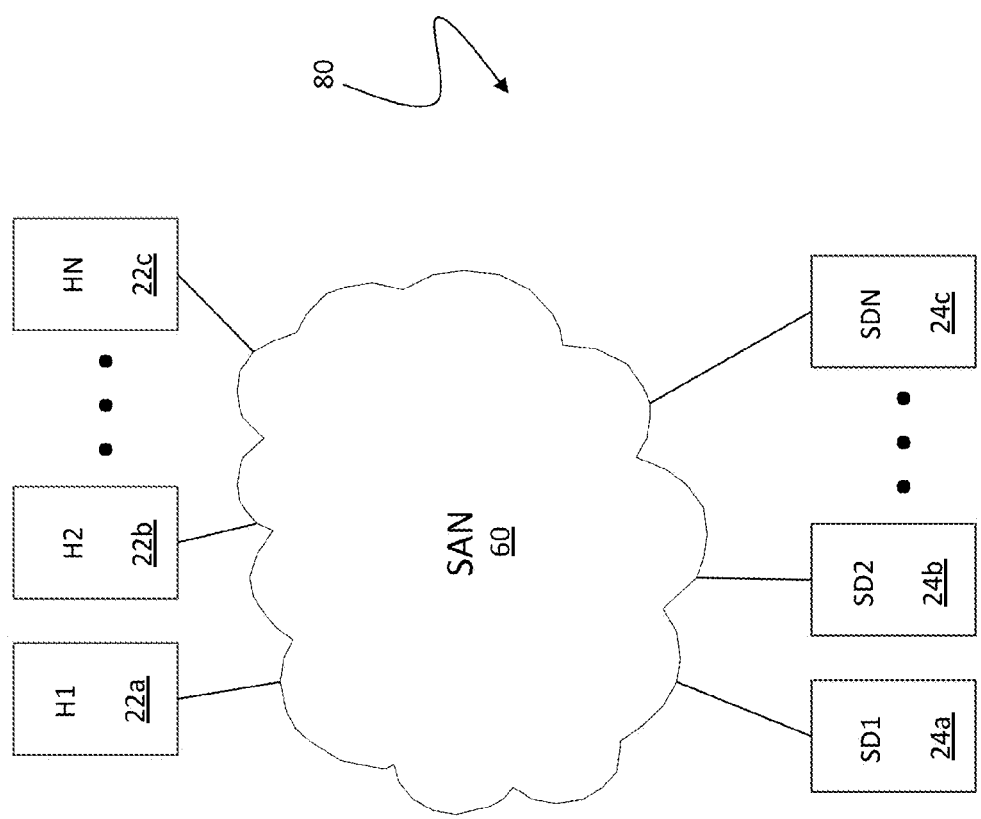
FIG. 3 is a schematic diagram showing a plurality of hosts coupled to a plurality of storage devices via a storage array network (SAN).

FIG. 3 is a schematic illustration 80 showing a storage area network (SAN) 60 providing a SAN fabric coupling a plurality of host devices (H1-HN) 22a-c to a plurality of storage devices (SD1-SDN) 24a-c. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage device 24a. Upon becoming activated (e.g., powering up), the host 22a and the storage device 24a may send appropriate signals to the switch(es) of the storage area network 60, and each other, which then allows the host 22a to initiate a data-path connection between the port of the host 22a and the port of the storage device 24a. Zones may be defined in terms of a unique identifier associated with each of the ports, such as such as a 64-bit worldwide port name (WWPN).

In various embodiments, the system described herein may be used in connection with performance data collection for data migration and/or data mirroring techniques using a SAN. Data transfer among storage devices, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from EMC Corporation.

For further discussion of techniques involving the configuration and use of storage area networks, including virtual storage area networks, references is made, for example, to U.S. Pat. No. 8,028,062 to Wigmore et al., entitled "Non-Disruptive Data Mobility Using Virtual Storage Area Networks With Split Path Virtualization," which is assigned to EMC Corporation and is incorporated herein by reference, that discloses techniques for the creation of a SAN centric storage virtualization layer that allows data mobility and migration without disruption to one or more hosts servers attached to the SAN.

Figure 4:
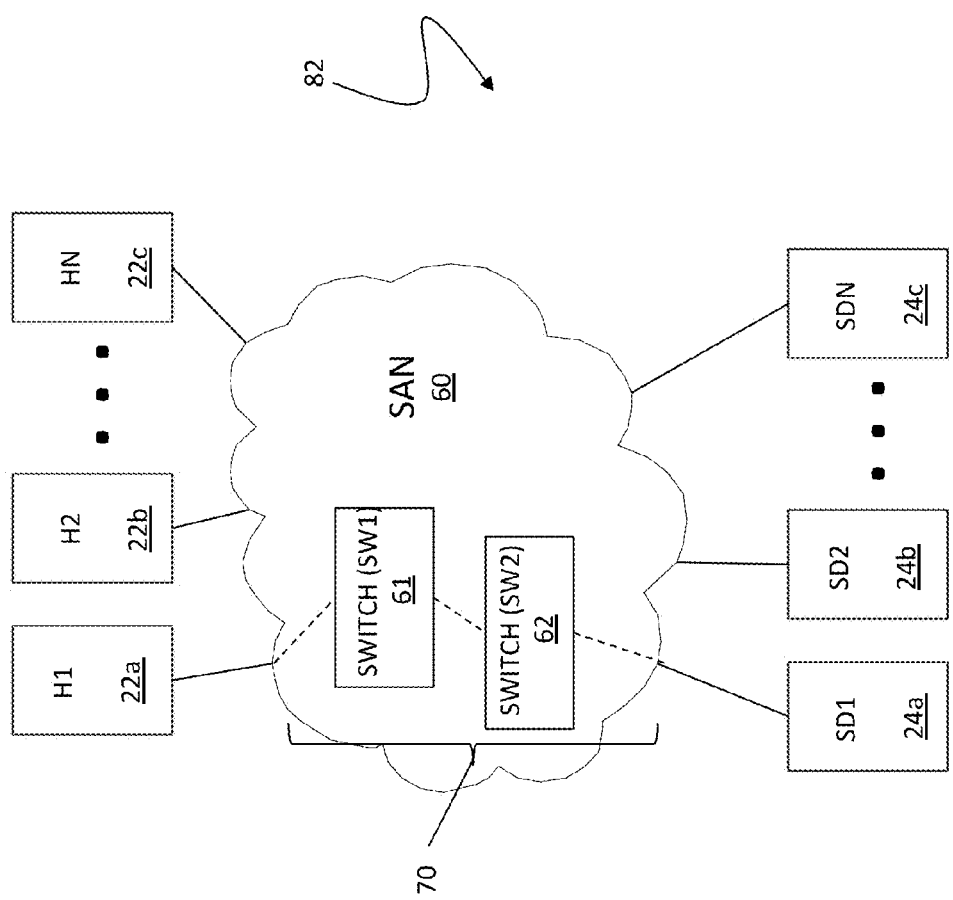
FIG. 4 is a schematic illustration of an embodiment of the SAN shown in FIG. 3 including multiple switches providing an I/O path between a host and a storage device in connection with an embodiment of the system described herein.

FIG. 4 is a schematic illustration 82 showing multiple SAN switches of a SAN, like that of FIG. 3, that may be used in connection with an embodiment of the system described herein. In the illustrated embodiment, the SAN is shown with two switches, switch 61 (SW1) and switch 62 (SW2), that are used in connection with an I/O data path 70 from the host 22a to the storage device 24a. In various embodiments, the switches 61, 62 may include physical and/or logical devices. Although two switches are shown, more than two switches and/or other appropriate elements of a SAN fabric may be used in connection with the providing of I/O data paths from one or more of the hosts 22a-c to one or more of the storages devices 24a-c in connection with path performance data collection according to the system described herein.

The selection and/or identification of the I/O path 70 may be performed according to multiple selection factors and using known path selection techniques. Reference is made, for example, to U.S. Pat. No. 7,688,753 to Zimran et al., entitled "Selection of a Data Path Based on One or More Performance Characteristics of a Computer System," which is assigned to EMC Corporation and is incorporated herein by reference and which discloses techniques for data path selection based on performance characteristics of a computer system using a path selection module. Reference is also made to U.S. Pat. No. 6,434,637 to D'Errico, entitled "Method and Apparatus for Balancing Workloads Among Paths in a Multi-Path Computer System Based on the State of Previous I/O Operations," which is assigned to EMC corporation and is incorporated herein by reference and which discloses techniques for selecting one of at least two I/O data paths for transmission of the next I/O operation based upon a state of previously assigned I/O operations queued for transmission over the I/O paths.

Figure 5:
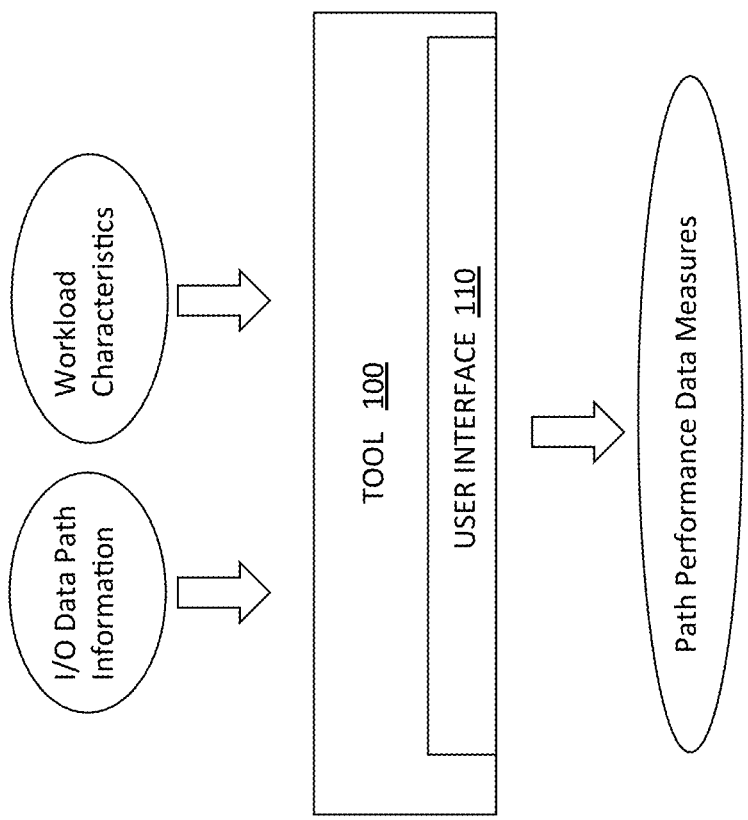
FIG. 5 is a schematic illustration of a tool, application and/or utility having a user interface that may receive as input path data identification information and workload characteristics of element of the path and output collected performance data metrics according to an embodiment of the system described herein.

FIG. 5 is a schematic illustration of an tool, application and/or utility 100, having a user interface 110, that may receive as input path data identification information and performance indicators for workload characteristics of elements of the path and output collected performance data metrics according to an embodiment of the system described herein. Workload characteristics may include for each configuration item (CI) of the I/O path from a host to a storage device, through a SAN, such as the average number of I/Os per unit time (e.g., seconds), the write percentage and/or the average amount of data per unit time (e.g., number of MB per second), among other appropriate characteristics and performance indicators. The user interface 110 of the tool 100 may allow configuration by a user in connection with turning on and off data collection for multiple I/O paths, as further discussed elsewhere herein. The user interface 110 of the tool 100 according to the system described may then display and/or otherwise output path data performance measures and statistics.

In various embodiment, the tool 100 may be an application installed on an application host or other computer providing SAN administration and/or management functionality and/or may be installed on one or more of the hosts 22a-c coupled to the SAN. In an embodiment, the tool 100 may include a ProSphere® product produced by EMC Corporation that provides storage resource management functionality. It is noted that statistics used by the tool 100 according to the system described herein may be gathered by the tool itself and/or may be obtained from other sources, such as, for example, data obtained from products produced by EMC Corporation including, the EMC Workload Analyzer (WLA), the Symmetrix Performance Analyzer (SPA)® and/or the Symmetrix CLI statistics collection daemon (STP), among other possible collection devices, applications and/or tools. Reference is made, for example, to U.S. Pat. No. 6,622,221 to Zahavi, entitled "Workload Analyzer and Optimizer Integration," which is assigned to EMC Corporation and is incorporated herein by reference and which discloses techniques used in connection with evaluating the performance of proposed device swap plans in accordance with past performance data collected. Additionally, the system described herein may be used in connection with the systems and methods disclosed in U.S. patent application Ser. No. 12/807,943 to Colon et al., filed Sep. 17, 2010, also assigned to EMC Corporation, entitled "Techniques for Identifying Devices Having Slow Response Times," which is incorporated herein by reference and which provides techniques for identifying one or more data storage volumes, such as one or more logical volumes, exhibiting a performance problem, such as long response times.

The tool 100 according to the system described herein provides for controlled tuning performance data collection through a single application control. In an embodiment, performance data collection may be turned on or off from the application host running the tool 100 via the user interface 110. The tool 100 may automatically (e.g., without user intervention) update performance data collection characteristics as the application host I/O data path changes according to user controlled settings but without requiring further user intervention during the updating. In various embodiments, the tool may update continuously and/or at specified intervals. Turning on path performance data collection on the application host via the user interface 110 may automatically set up synchronized performance data collection for all managed objects within an I/O data path.

A data I/O path, like the data I/O path 70, may be made up of managed objects from the application host, such as host 22a, though multiple switches 61, 62 in the SAN fabric 60 down to the storage device 24a to which the application host (host 22a) is connected (see FIG. 4). Over time, as the components of the SAN change (e.g., host adapter gets replaced, switch ports are changed and/or storage devices get swapped out) the system described herein may automatically determine what has changed for any I/O data path for the application host and adjust what performance data is to be collected and may ensure collection continues to be synchronized. Such functionality may advantageously be used for troubleshooting performance issues for an application from an end-to-end perspective.

Figure 6:
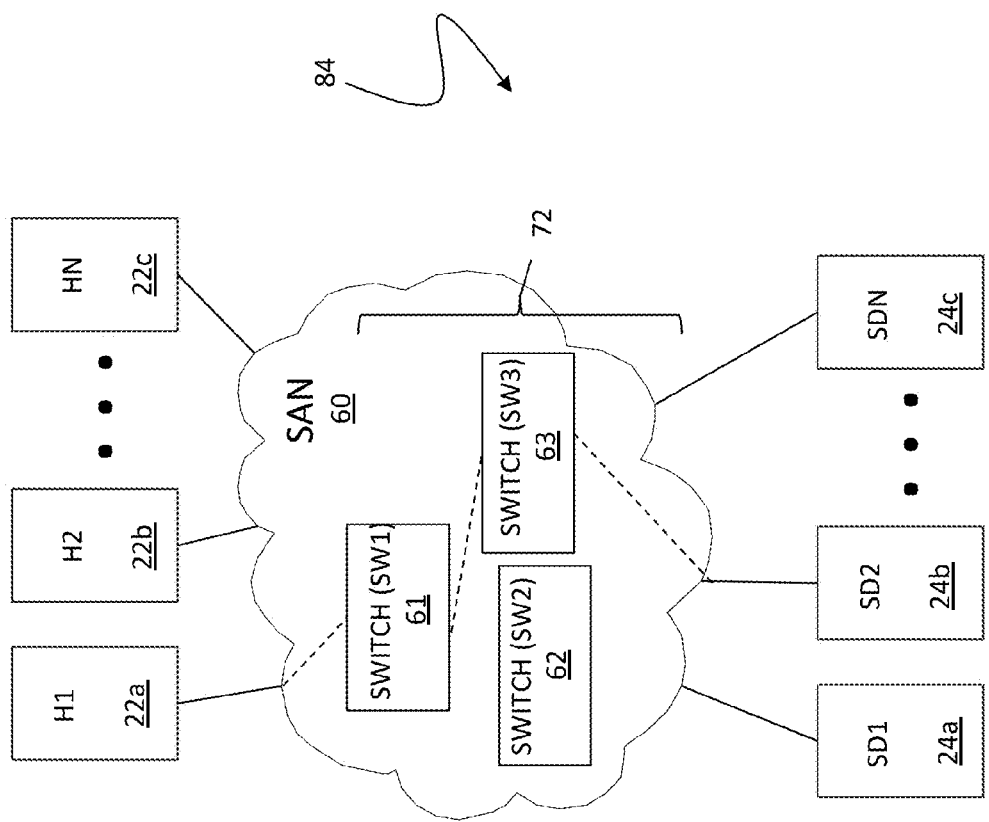
FIG. 6 is a schematic illustration showing a changed I/O data path in the SAN that reflects a change from the I/O data path shown in FIG. 4.

FIG. 6 is a schematic illustration 84 showing a changed I/O data path 72 in the SAN 60 that reflects a change from the I/O data path 70 shown in FIG. 4. A change in the I/O data path of the host 22a is shown schematically in which the I/O data path 72 now includes switch 61 (SW1) and switch 63 (SW3), instead of switch 62 (SW2), and a storage device has been swapped such that I/O data path of the host 22a is now includes the storage device 24b (SD2) rather than storage device 24a (SD1). As further discussed herein, the changes to the I/O path may include, for example, changes to host devices, switches, switch ports, storage devices and/or device ports, among other suitable I/O data path element changes. The tool 100, according to the system described herein, may automatically determine the changes in the I/O data path 72 and adjust the data performance metrics being collected according to the new elements of the I/O data path 72 without requiring any user intervention.

Figure 7:
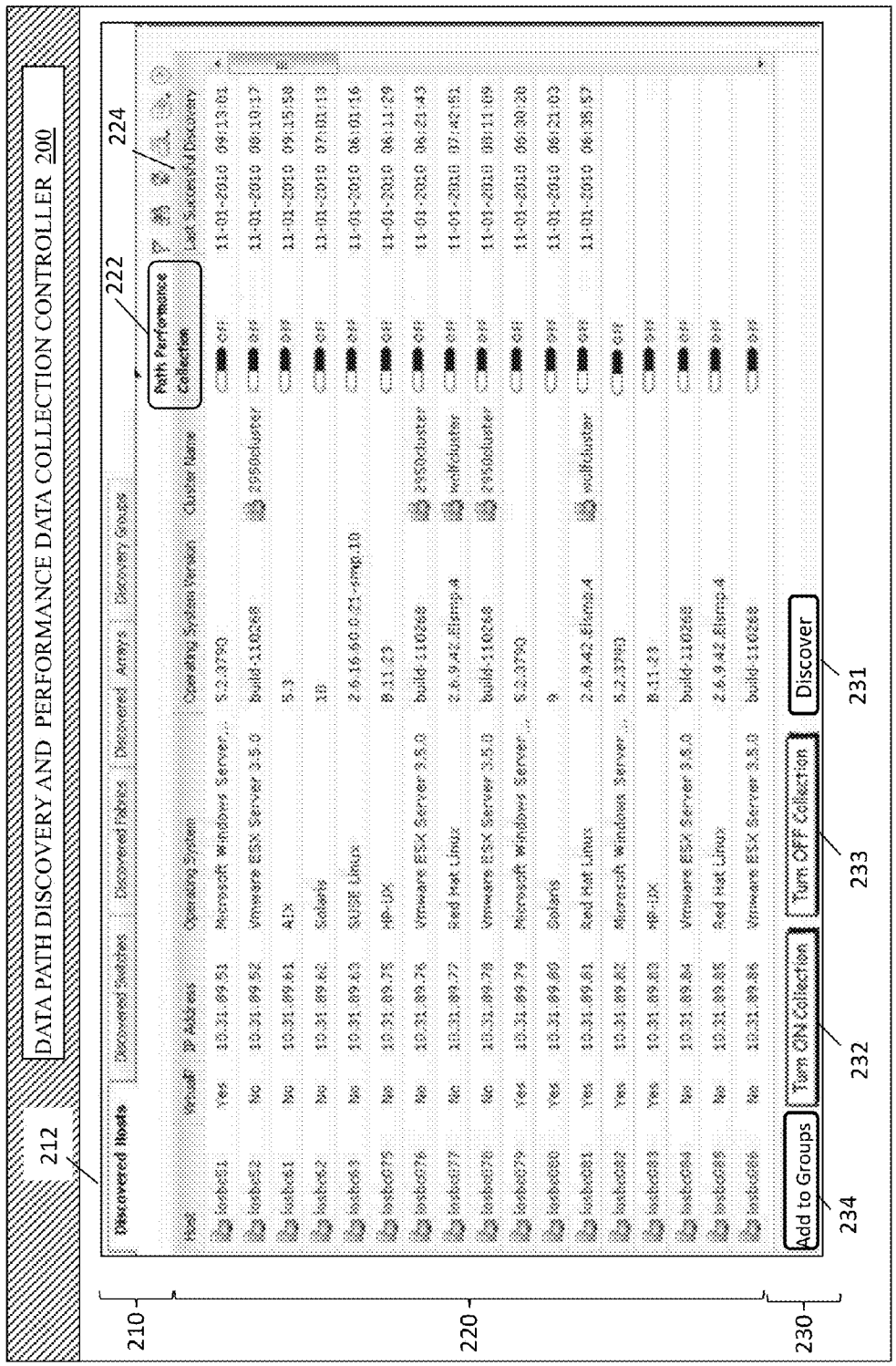
FIG. 7 is a schematic illustration showing an example of a controller of the interface for controlling path performance data collection according to an embodiment of the system described herein.

FIG. 7 is a schematic illustration showing an example of a controller 200 of the interface 110 according to an embodiment of the system described herein. The controller 200 may be a screen of the interface 110 and provides data path discovery and performance data collection control functionality in connection with the tool 100. Multiple elements of I/O data paths, such as the I/O data path 70 or the I/O data path 72, may be discovered according to the system described herein in accordance with techniques discussed elsewhere herein. The elements, shown in header section 210, may include discovered hosts, switches, fabrics, arrays, and groups/clusters. The particular header of section 210 shown in the figure corresponds to discovered hosts 212 which may provide an indication of the discovery of complete I/O data paths from one or more hosts through the SAN and elements thereof to one or more storage devices or arrays.

Specifically, section 220 details multiple I/O data paths that have been discovered for multiple hosts. Information of the I/O data paths identifies the discovered hosts, whether the hosts are virtual (e.g., running as guest operating system or a virtual machine (VM)) or not, the hosts' IP addresses, operating systems and versions thereof, and whether the host is in a group or cluster. In connection with the system described herein, column 222 identifies whether data path performance collection has been activated and column 224 identifies when the last successful discovery process performed to identify the hosts and I/O data paths. In an embodiment, the discovery process may be performed automatically, for example, at periodic scheduled intervals. In another embodiment, a user may also use the interface 110 to manually provide for a discovery process in addition to scheduled discovery processes, for example, by activating the Discover button 231 in the section 230 further discussed below.

Section 230 provides for control by a user using the interface 110 of the discovery and path performance data collection processes. As noted above, the Discover button 231 may be used by a user to manual activate a I/O data path discovery process; however, the system described herein may further operate with automatic discovery scans. For any discovered host I/O data path, the interface provides for a single-click control interface to turn on or off path data collection processing for particular I/O data path(s). This is illustrated with the Turn On Collection button 232 and the Turn Off Collection button 233 that may be used for any one or more of the I/O data paths for the discovered hosts shown in the section 220.

In an embodiment, the system described herein also provides for grouping host I/O data paths to allow for consolidated analysis of the I/O data paths with a single click using the interface 110. This is illustrated by the Add to Groups button 234, as further discussed elsewhere herein. It is noted that other layouts and configurations for the controller 200, like that of other interface controller screens discussed elsewhere herein, are possible and may be configured according to particular administrator and system policies and requirements.

Figure 8:
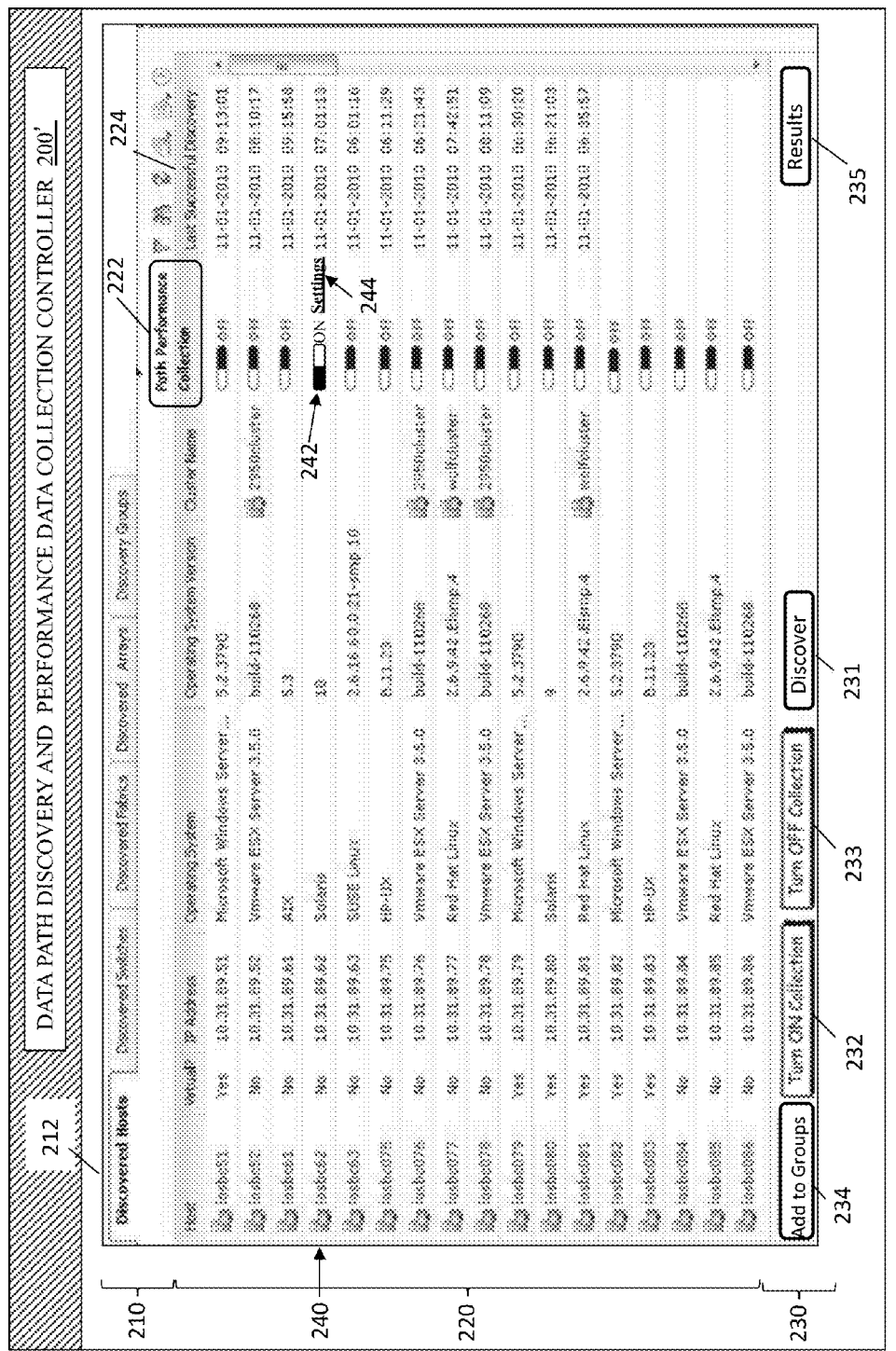
FIG. 8 is a schematic illustration showing another embodiment of a controller for controlling path performance data collection according to an embodiment of the system described herein.

FIG. 8 is a schematic illustration showing a controller 200', like the controller 200, in which, for a host entry 240 for host "losbc62", path performance data collection has been turned on, as shown by the indicator 242, according to an embodiment of the system described herein. In various embodiments, path performance data collection may be turned on by selecting the desired host and clicking on the Turn ON Collection button 232 and/or, alternatively, the indicator 242 may provide for a toggling action between ON and OFF by clicking directly on the indicator 242. When activated, path performance collection may occur for every I/O data path of the host 240, thereby the collection may be synchronized for all elements of the I/O data paths to collect statistics for the elements at the same time. Settings for path performance collection may be controlled by a default settings. For example, the intervals between collection scans may be subject to a default setting. For example, the interval may be 5 minutes, but may be set to any desirable interval. Settings for a specific host may be controlled via the interface 110 by clicking on a Settings link or button 244 for each discovered host for which path performance collection is activated that will allow the user to view and adjust settings from a settings controller, as further discussed elsewhere herein. After path performance collection is activated for at least one host, results of the data collection for I/O data paths of the host may be viewed by clicking on a Results button 235, as further discussed elsewhere herein.

Figure 9:
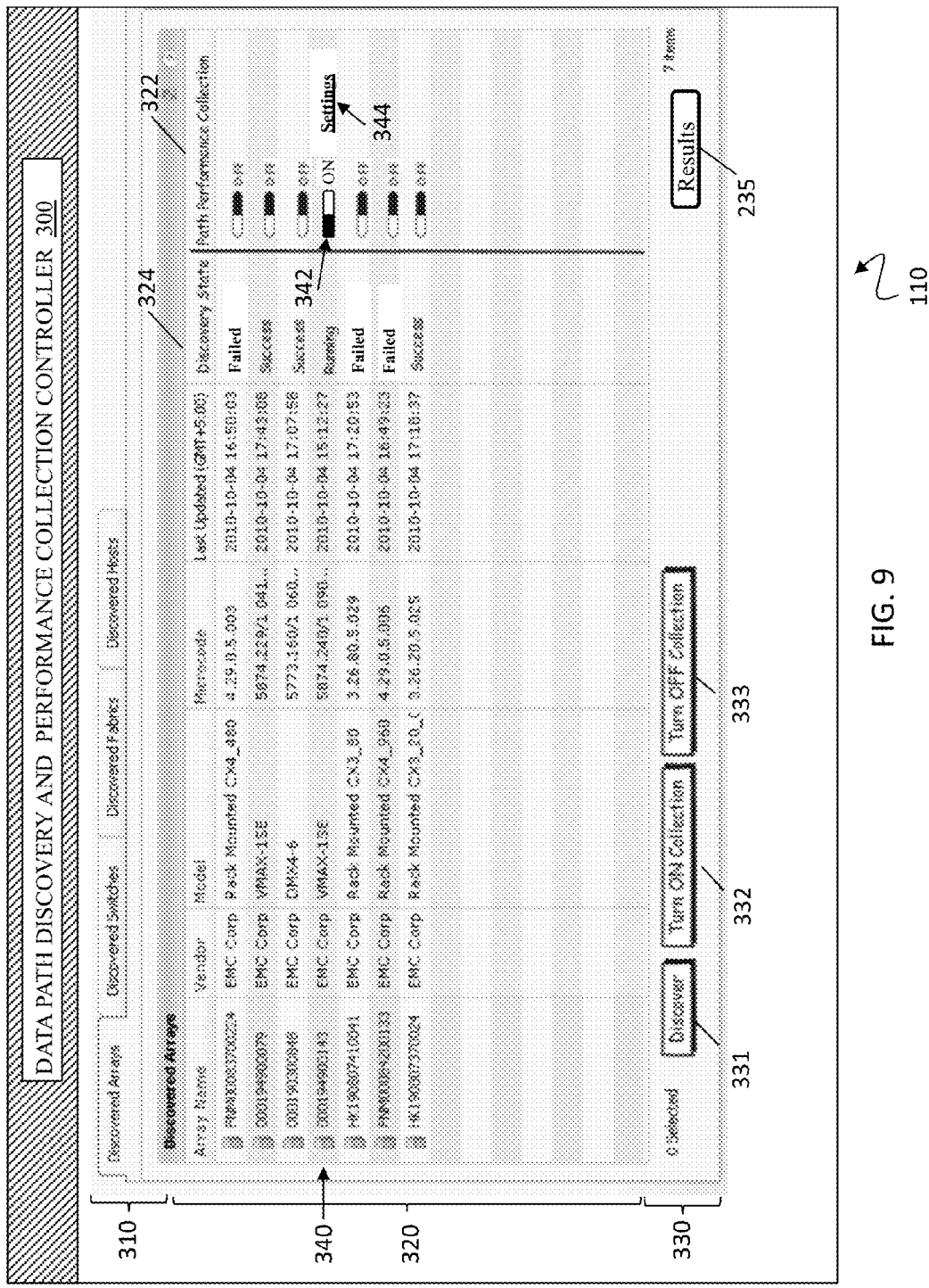
FIG. 9 is a schematic illustration showing a controller that may be another screen of the interface according to an embodiment of the system described herein.

FIG. 9 is a schematic illustration showing a controller 300 that may be another screen of the interface 110 according to an embodiment of the system described herein. The controller 300 shows identification of discovered arrays/storage devices of a SAN, similar to the display of discovered hosts shown in connection with interface screens of the controllers 200, 200'. It is noted that screens similar to that described for the controller 300 may be provided for other discovered elements including discovered switches and fabrics of the SAN, as illustrated by the tabs in section 310. Section 320 shows discovered arrays that have been discovered by one or more discovery scans. In an embodiment, the discovery process may be performed automatically, for example, at periodic scheduled intervals. In another embodiment, a user may also use the interface 110 to manually provide for a discovery process in addition to scheduled discovery processes, for example, by activating the Discover button 331 in section 330 further discussed below.

The section 320 provides various information concerning discovered arrays including name, vendor, model, microcode and time of last update. Additionally, column 324 shows the Discovery state or status of the arrays. For example, a successful discovery may indicate that a particular array has been identified and all relevant information for inclusion in an I/O data path identified, whereas a failed discovery may indicate that certain information from the particular array has not been determined by the last discovery scan. The system may attempt to resolve failures with periodic scans. A status of "Running" may indicate that the array is in an I/O data path for which performance data is currently being collected. Column 322 shows whether path performance collection has been turned on or off for the array. For example, in the illustration, for the array entry 340 for "000194900143," the path performance collection indicator 342 shows that path performance collection is turned on for the array, thereby the array is in an I/O data path for which performance data is being collected. For example, the array 340 may be in one or more of the I/O data paths for the host losbc62 (see FIGS. 7 and 8) for which collection of path performance data has been turned on.

A settings link/button 344 may be used to identify the settings and other collection information, such as identification of the I/O data path, for the array 340, as further discussed elsewhere herein. Buttons 332 and 333 of the section 330 may be used to turn performance data collection on or off for a particular array. This level of control may enable problem identification in particular elements (arrays, switches, fabric etc.) of an I/O data path. A results button 335 may be used to view displayed results of the performance data collection, as further discussed elsewhere herein.

Figure 10:
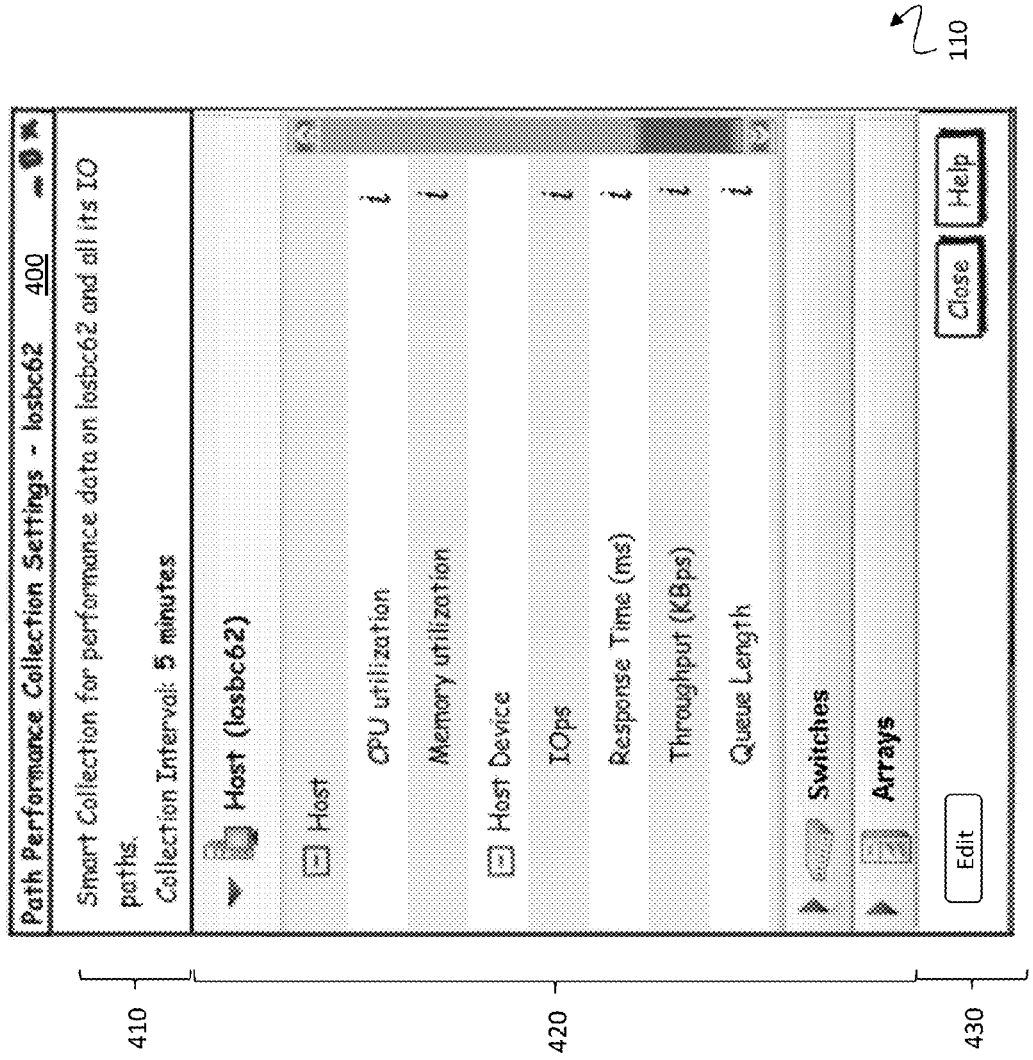
FIG. 10 is a schematic illustration of a path performance collection settings controller that may be a screen of the user interface according to an embodiment of the system described herein.

FIG. 10 is a schematic illustration of a path performance collection settings controller 400 that may be a screen of the user interface 110 according to an embodiment of the system described herein. In the figure, the settings for the path performance collection for the host losbc62 are being illustrated. Section 410 shows the schedule for the automated "smart" collection of performance data for all I/O data paths for host losbc62. Section 420 enables selection and viewing of collection setting information for particular elements of the I/O data paths of the indicated host, including but not limited to workload and performance characteristics such as CPU utilization, memory utilization for the host and IOps (I/O in Mb per sec), response time in ms, throughput in Kbps, and queue length for host devices. Other elements for which information may be obtained include the switches and arrays, as shown in section 420. Section 430 shows buttons that allow the user to edit settings of the path performance data collection, among other control functionalities.

Figure 11:
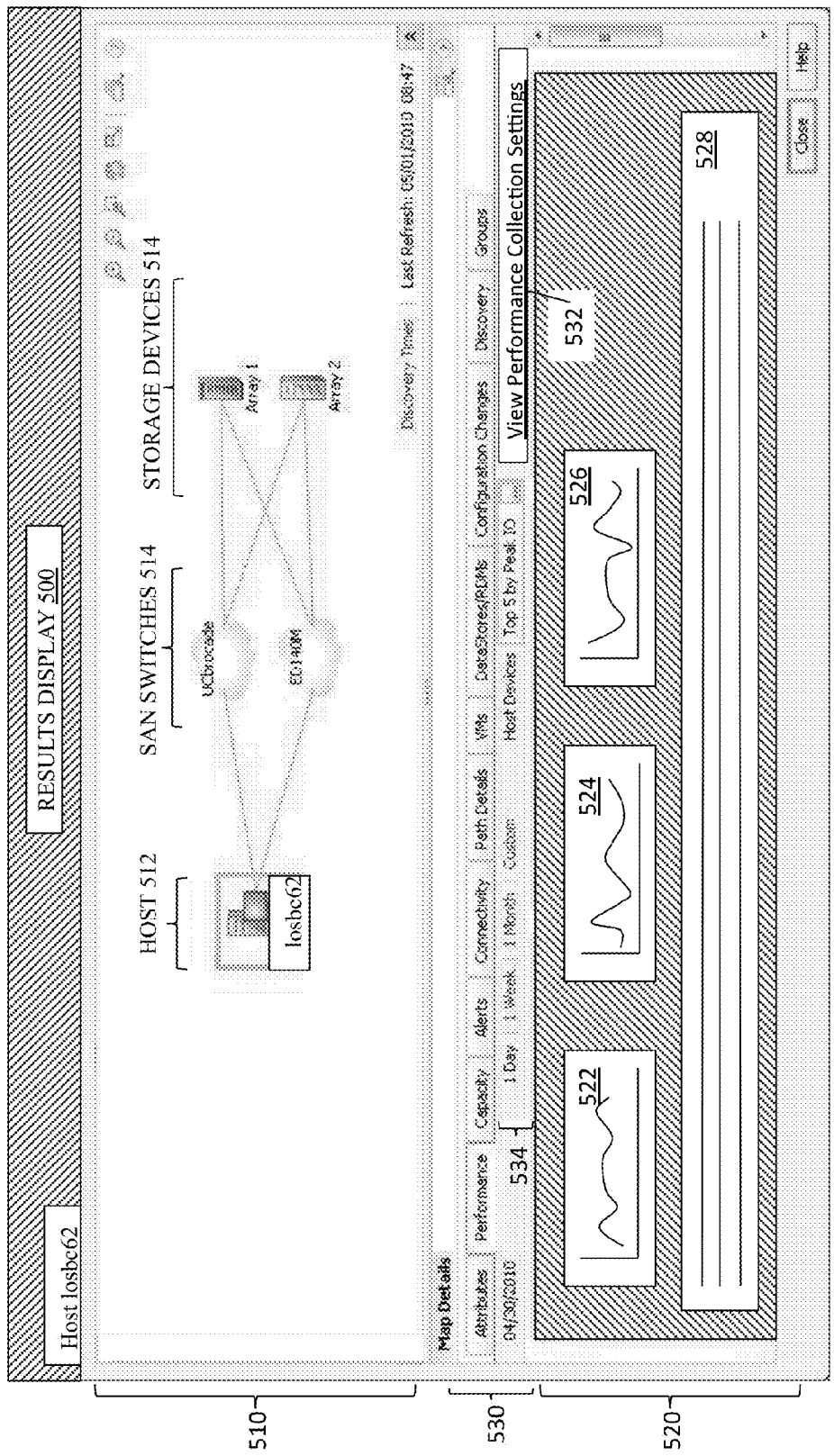
FIG. 11 is a schematic illustration showing a results display according to an embodiment of the system described herein.

FIG. 11 is a schematic illustration showing a results display 500, for example, after clicking on the results button 235 according to an embodiment of the system described herein. The results display 500 may include a graphical section 510 that shows a visual representation of an I/O data path for the selected host, in the illustrated case, for host losbc62. For example, the section 510 graphical displays the host 512, coupled via SAN switches 514, to one or more storage devices/arrays 516. Section 520 may display map details of the I/O data paths, for example performance data for particular elements of the I/O data paths in graph form 522, 524, 526 as well as in text or tabulated form 528. The performance measures displayed may include those discussed elsewhere herein, including workload and performance characteristics such as CPU utilization, memory utilization for the host and IOps (I/O in Mb per sec), response time in ms, throughput in KBps, and queue length for host devices, switches, arrays etc., among other appropriate measures.

Section 530 indicates that multiple types of detail and performance measures may be displayed in various forms for the application host, including features corresponding to the I/O data path attributes, performance, capacity, alerts, connectivity, path details, virtual machine (VM) information, data stores, configuration changes, discovery details and group details. A link button 532 may be provided to view performance collection settings. Additionally, portion 534 indicates that historical or past performance data collection may be maintained by the system. For example, a user may view past performance data collection from the prior day, prior week, prior month and/or any other customizable date range.

Figure 12:
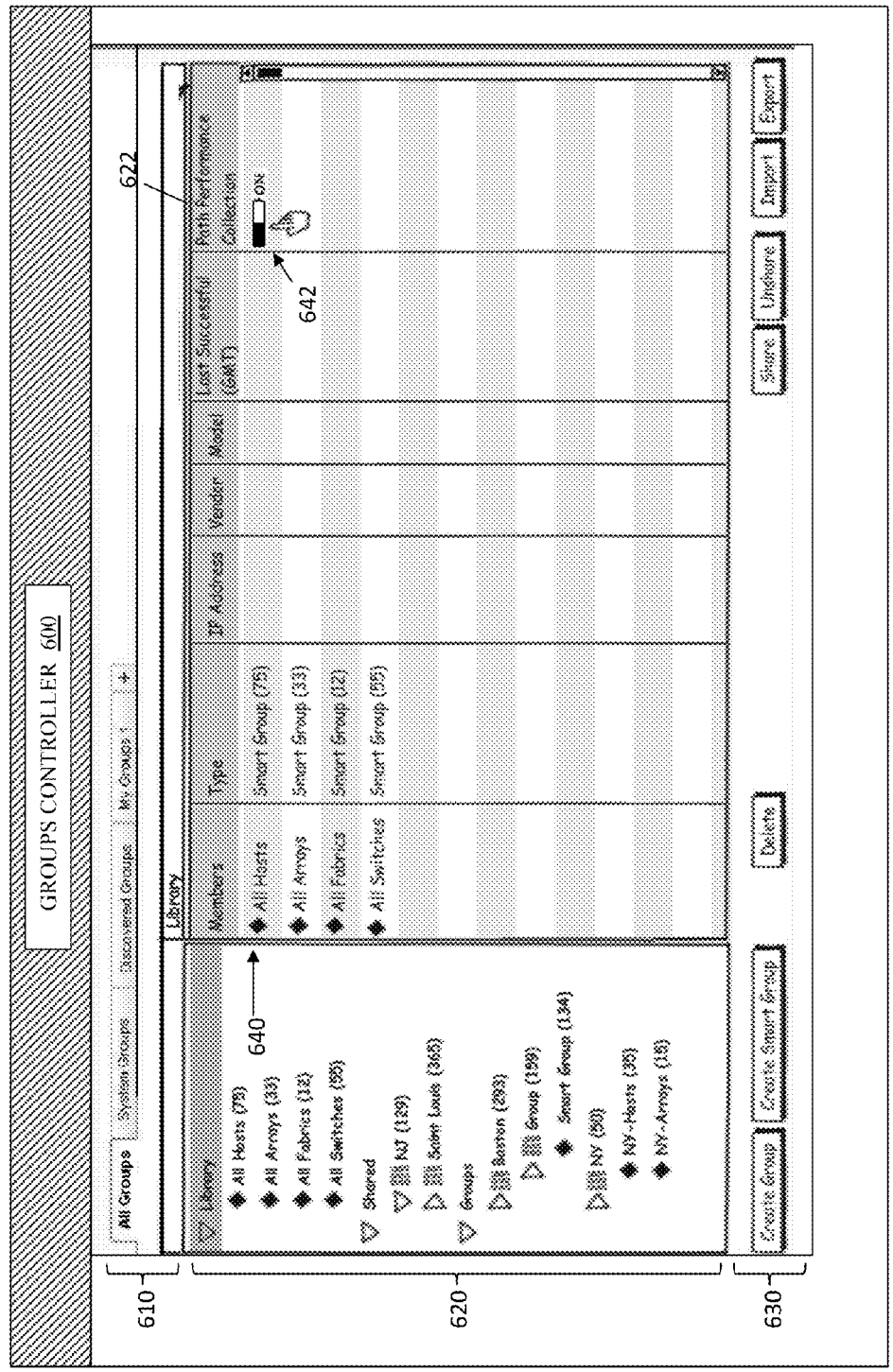
FIG. 12 is a schematic illustration showing a groups controller that may be provided by the interface according to an embodiment of the system described herein.

FIG. 12 is a schematic illustration showing a groups controller 600 that may be provided by the interface 110 according to an embodiment of the system described herein. The group controller 600 enables the selection, creation and configuring of groups of elements in I/O data paths according to the system described herein. Groups may be defined using default settings for the entire group (e.g., Groups) and/or may be configurable with specific collection settings within a group (e.g., Smart Groups). Section 610 shows the identification of various group types and subsets thereof. Section 620 shows specific information concerning selected groups and may include information for groups of hosts, arrays, fabrics, switches etc. of the I/O data paths. Column 622 shows the indicators for whether path performance collection is turned on or off for particular groups. In the illustrated embodiment, an indicator 642 shows that path performance collection is turned on for a group of hosts 640. Section 630 shows buttons that may be used to create and delete groups and smart groups according to configurations by the user. Information concerning groups may also be shared and unshared and imported and exported, as shown by buttons in the section 630. It is noted that group settings may be created and/or shared among groups of varying geographical regions (e.g., Boston, Saint Louis, New York etc.).

Figure 13:
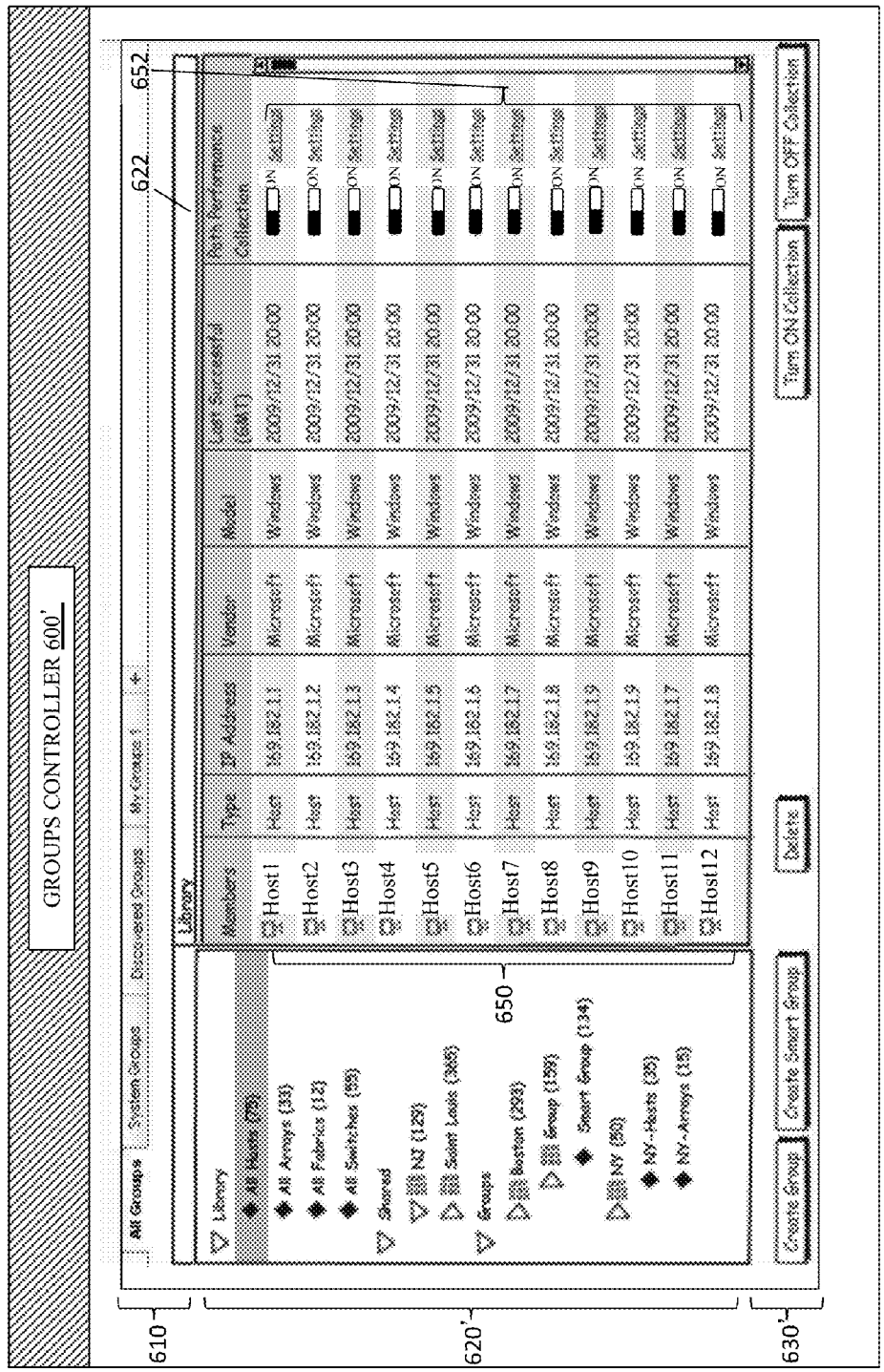
FIG. 13 is a schematic illustration showing more specific information in a section concerning a group of hosts according to an embodiment of the system described herein.

FIG. 13 is a schematic illustration showing more specific information in a section 620' concerning a group of hosts 650 according to an embodiment of the system described herein. Hosts 1-12 650 are shown in the illustrated screen window and it is noted that the turning of path performance collection on for the entire group in FIG. 12 has turned on path performance collection for the I/O data paths of each of the Hosts 1-12 650 as shown by the indicators 652 in accordance with the system described herein. Section 630' shows Turn ON Collection and Turn OFF Collection buttons that may be used to turn on or off collections for individual ones of the selected host group. Other configurations and groups designations may be specified by a user according to desired administrator and/or system requirements.

Figure 14:
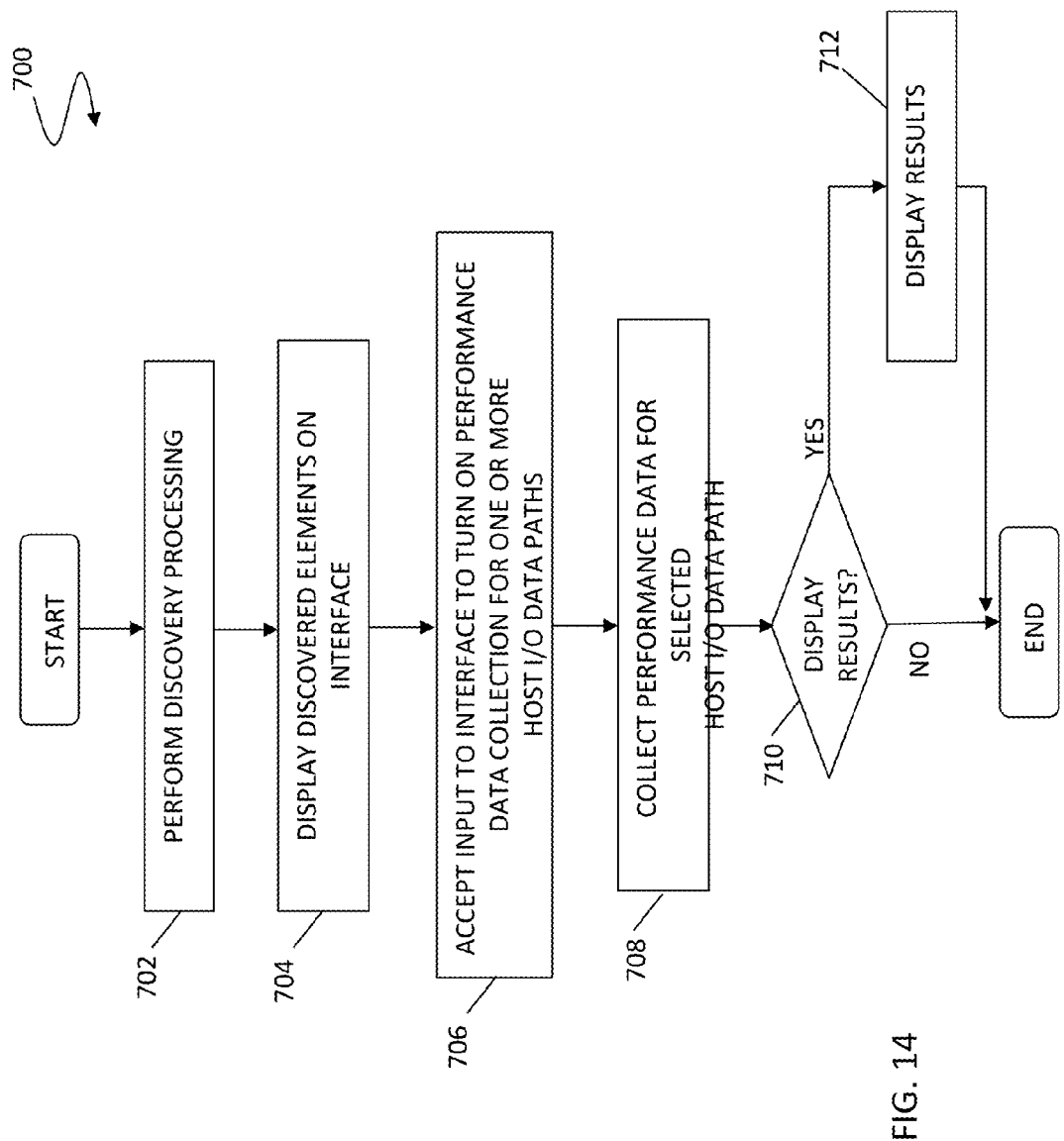
FIG. 14 is a flow diagram showing an iteration of path discovery processing and path performance data collection processing according to an embodiment of the system described herein.

FIG. 14 is a flow diagram 700 showing an iteration of path discovery processing and path performance data collection processing according to an embodiment of the system described herein. At a step 702, a discovery process is performed to identify elements of a SAN through which one or more I/O data paths of one or more host exist. I/O data paths may exist from one or more hosts to one or more storage arrays or devices via switches and/or other elements of the SAN. In an embodiment, the discovery process may be automated to occur continuously and/or at scheduled intervals. Accordingly, the process may automatically identify changes to I/O data paths that may occur as a result of changes to the elements of the SAN without requiring user intervention. In this way, the system is self-tuning to respond to the changes in I/O data paths without requiring that the user have information or knowledge concerning the I/O data path changes. Settings controlling the automation may be set and/or otherwise controlled via a user interface, as further discussed elsewhere herein.

After the step 702, processing proceeds to a step 704 where the discovered elements from the discovery process may be displayed on the user interface. The discovered elements may include one or more hosts from which one or more I/O data paths extend. After the step 704, processing proceeds to a step 706 where the interface receives user input to turn on performance data collection for the one or more of the discovered hosts to collect performance data for the I/O data paths thereof. In an embodiment, the input is a single click on a performance data collection indicator and/or an button to turn on collection. After the step 706, processing proceeds to a step 708 where performance data for I/O data paths of the one or more selected hosts is collected. After the step 708, processing proceeds to a test step 710 where it is determined whether the results of the collection are to be displayed. For example, whether the user has requested the interface to display the results. If not then processing of the iteration of performance data collection is complete. If the results are to be displayed, then processing proceeds to a step 712 where the collection results are displayed on the interface. After the step 712, processing of the iteration is complete.

Figure 15:
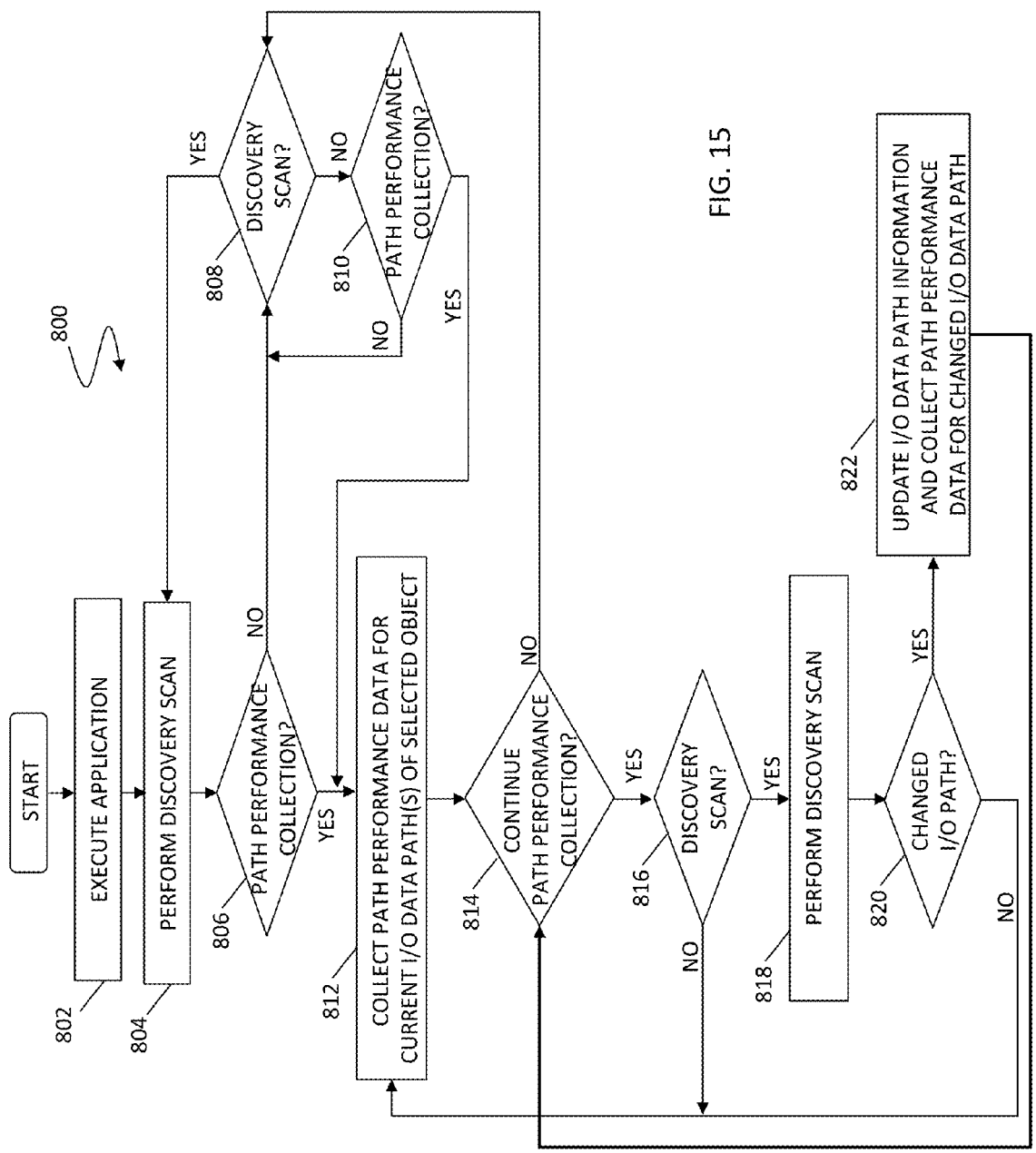
FIG. 15 is a more detailed flow diagram showing the processing of the system described herein for the automated identification of changes in I/O data paths and the collection of path performance data thereof according to an embodiment of the system described herein.

FIG. 15 is a more detailed flow diagram 800 showing the processing of the system described herein for the automated identification of changes in I/O data paths and the collection of path performance data thereof according to an embodiment of the system described herein. At a step 802, an path performance data collection application according to the system described herein is executed. After the step 802, processing proceeds to a step 804 where discovery processing is performed to discover elements of one or more storage area networks, including hosts and storage arrays, according to the system described herein. After the step 804, processing proceeds to a test step 806 where it is determined whether path performance collection processing has been activated for one or more of the discovered hosts. In an embodiment, path performance collection processing may be activated, for example, via an interface by an user clicking, with a single click, on a path performance collection button or indicator.

If no path performance collection processing has been activated at the test step 806, then processing proceeds to a test step 808 where it is determined whether another discovery scan is to occur according to the scheduled intervals for discovery scans for automatically updating the discovery processes according to the system described herein. Discovery scans may be scheduled through the interface. If it is time for a scheduled discovery scan, then processing proceeds back to the step 804. Otherwise, processing proceeds from the test step 808 to a test step 810 where it is determined whether any performance data collection processing has been activated by a user. If not then processing proceeds back to the test step 808. In this way, the system described herein provides for automated and continuous discovery scanning while a path performance data collection application is active.

If at the test step 810, and, likewise at the test step 806, it is determined that path performance collection processing has been activated via the interface, in a manner as discussed elsewhere herein, then processing proceeds to a step 812 where path performance data is collected for all I/O paths of one or more discovered hosts according or other objects to the selections made via the interface. After the step 812, processing proceeds to a test step 814 where it is determined whether path performance data collection is to continue. For example, it is determined whether a user has turned off collection for the selected hosts via the interface. If path performance data collection is not to continue as determined at the test step 814 (e.g. the user has clicked on the turn off collection button/indicator) then processing proceeds back to the test step 808 where it is again determined whether another scheduled discovery scan is to occur to update the discovered elements, as discussed above.

If, at the test step 814, it is determined that path performance data collection is to continue, then processing proceeds to a test step 816 where it is determined whether another scheduled discovery scan is to occur. If not then processing proceeds back to the step 812 where the system continues to collect path performance data for the I/O data path(s) of the selected host(s). If, at the test step 816, it is determined that it is time for another scheduled discovery scan, then processing proceeds to a step 818 where the discovery scan is performed. After the step 818, processing proceeds to a test step 820 where it is determined whether any of the I/O data paths of the selected host(s) have changed. If not, then processing proceeds back to the step 812 where the system continues to collect path performance data for the current I/O data path(s) of the selected host(s). If, however, at the test step 820, it is determined that one or more of the I/O data paths have changed, then processing proceeds to a step 822 where the I/O data path information is updated automatically by the system described herein and path performance data for the changed I/O data paths is collected. After the step 822, processing proceeds back to the test step 814 where it is determined whether path performance data collection is to continue. Accordingly, the system described herein provides a self-tuning path performance data collection system using a single application control interface that may automatically and continuously update host I/O data path changes without requiring user intervention to detect and process the changes.

It is further noted that the system described herein may be used in connection with simulation of data storage systems for evaluation purposes. For example, I/O data paths of simulated storage system configurations may be evaluated to determine preferred configurations and/or identify potential problems of a possible I/O data path and elements thereof. Suitable data storage system simulation tools that may be used in connection with the system described herein may include systems and methods like that disclosed in U.S. Pat. No. 7,392,360 to Aharoni et al., entitled "Method and System for Capacity Planning and Configuring One or More Data Storage Systems," U.S. Pat. No. 7,292,969 to Aharoni et al., entitled "Method and System for Simulating Performance on One or More Storage Systems," and U.S. patent application Ser. No. 13/065,806 to Smirnov et al., filed Mar. 30, 2011, entitled "Write Pacing Simulation Tool," which are all assigned to EMC Corporation and which are all incorporated herein by reference.

According to another embodiment, the system described herein may provide display results from performance data analyses that present mini-chart overlays on a topology map based on intelligent analytics for components in one or more I/O data paths. The mini-charts may be advantageously used to show criticality of impact to assist a user with incident avoidance and/or to provide fast incident resolution. When launching into the topology map, the user may enable mini-charts and visually see from the charts where a possible performance bottleneck is detected by the analytics. In an embodiment, the mini-charts for the most relevant metrics may be displayed and identified for criticality. In various embodiments, the mini-charts may be colored and/or sized for criticality, among other appropriate visual criticality designations, The criticality visuals may be determined by thresholds, that may be set by a user and/or determined by the system, and may be calculated automatically based on learned base line, maximum line and minimum line operations over set times. A user may manually override a threshold set by the system, if desired.

The mini-charts may represent a small image of a full data chart. By selecting a mini-chart, the user may be shown the larger chart version and/or other details that may enable the user to locate and identify specific performance issues. An I/O data path may be made up of managed objects from an application host through multiple storage switches in the storage fabric down to the storage arrays to which the application host is connected. Performance metrics may be collected and analyzed by the system for selected objects, as discussed elsewhere herein. Events and alerts may be generated that alert the user to one or more conditions. The user may then select a relevant object and see the high level performance map based on the topology, as aided by the mini-charts and analytics described herein.

The system described herein advantageously simplifies the troubleshooting of performance issues for an application from an end-to-end perspective. The system described herein reduces required steps for display of useful performance analytics for a user. The user may simply turn on mini-charts (e.g., with a single click of a button) on the topology map of a selected application host or other object and the system described herein will handle correlation, chart creation, and analytical evaluation of potential bottlenecks and their visualization without requiring further user intervention. Further, the system may advantageously calculate thresholds and base lines based on learned or determined analytics and highlight mini-charts, for example, in colors such as red, green, yellow or other appropriate colors of a color coded criticality schema, to draw attention to main problem areas. In an embodiment, based on use of the mini-charts and resulting identification of problem areas of an I/O path, an alternative I/O path between relevant objects may be determined and selected either manually by a user and/or, in some cases, automatically by the system according to one or more policies.

Figure 16:
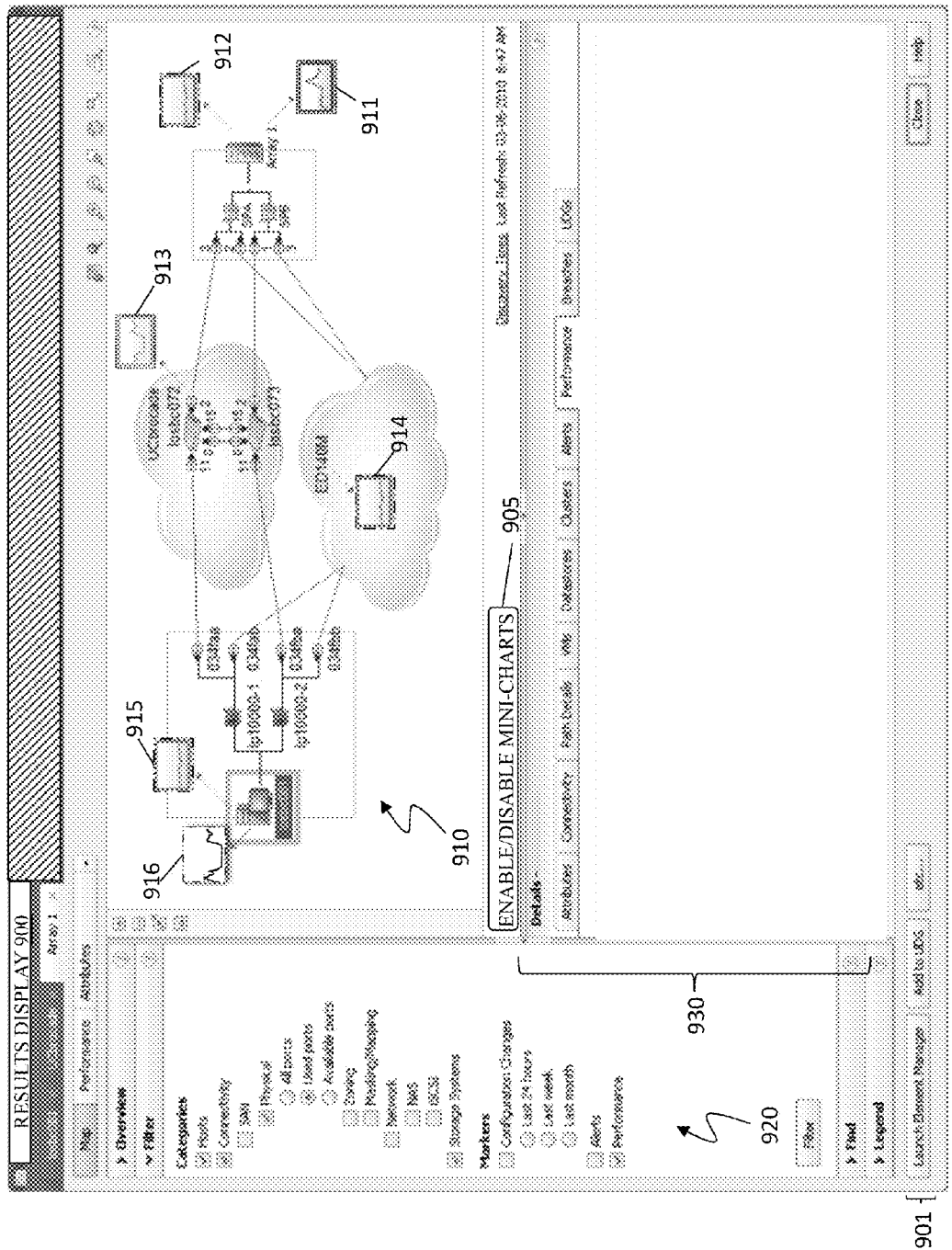
FIG. 16 is a schematic illustration showing a results display for an interface of an analytical tool according to an embodiment of the system described herein.

FIG. 16 is a schematic illustration showing a results display 900 for an interface of an analytical tool, like the interface 110 and tool 100 discussed elsewhere herein, according to an embodiment of the system described herein. In the illustrated embodiment, multiple tabs are shown in connection with obtaining performance data results for particular objects, including hosts, switches and arrays of an I/O path to or from a particular element (e.g., shown for objects and elements identified as: losbc081, UCbrocade, and Array 1). The results shown in the display 900 are for evaluations of an I/O path determined in connection with Array 1. A topology map 910 is shown for objects in the I/O path from the application host (losbc081) through switches of a fabric down to the Array 1. The objects and elements shown in the I/O path may be filtered using controls 920 that, for example, enable filtering of a topology map according to various categories of objects and elements, including hosts, switches or other elements of a network fabric and storage arrays. Other controls 901 of the display 900 may be provided, including a launch element manager control that may enable a user to launch to an interface and/or another application to manage a particular problem object identified according to the system described herein and/or a group button to add one or more objects to a particular group, among other control options.

A control button 905 is shown that may provide for enabling or disabling the display of the min-charts on the topology map. As illustrated, mini-charts have been enabled and multiple mini-charts 911-916 are shown on the topology map 910 and visually presented adjacent to corresponding objects and elements of the I/O path (e.g., the control button 905 has been clicked and mini-charts have been enabled). The mini-charts may be representative of full data charts corresponding to the collected performance data for the objects and elements of the I/O path. In an embodiment, the mini-chart may be a smaller version of the full data chart that visually resembles the full data chart, but which contains less presented data than the full data chart. As discussed elsewhere herein, the mini-charts 911-916 may be visually presented corresponding to thresholds of related data and indicate alerts levels of problem areas in the I/O path. In an embodiment, the mini-charts 911-916 may be colored for criticality according to a color coded criticality schema. The multiple color aspect of the mini-charts is illustrated in the figure by different styles of dashed-line borders of the mini-charts 911-916. A details display segment 930 is shown that may provide performance information and other detailed information, including, for example, information of attributes, connectivity, path details, VMs, data stores, clusters, alerts, breaches and used defined groups (UDG) in connection with the I/O path shown in the topology map 910.

Figure 17:
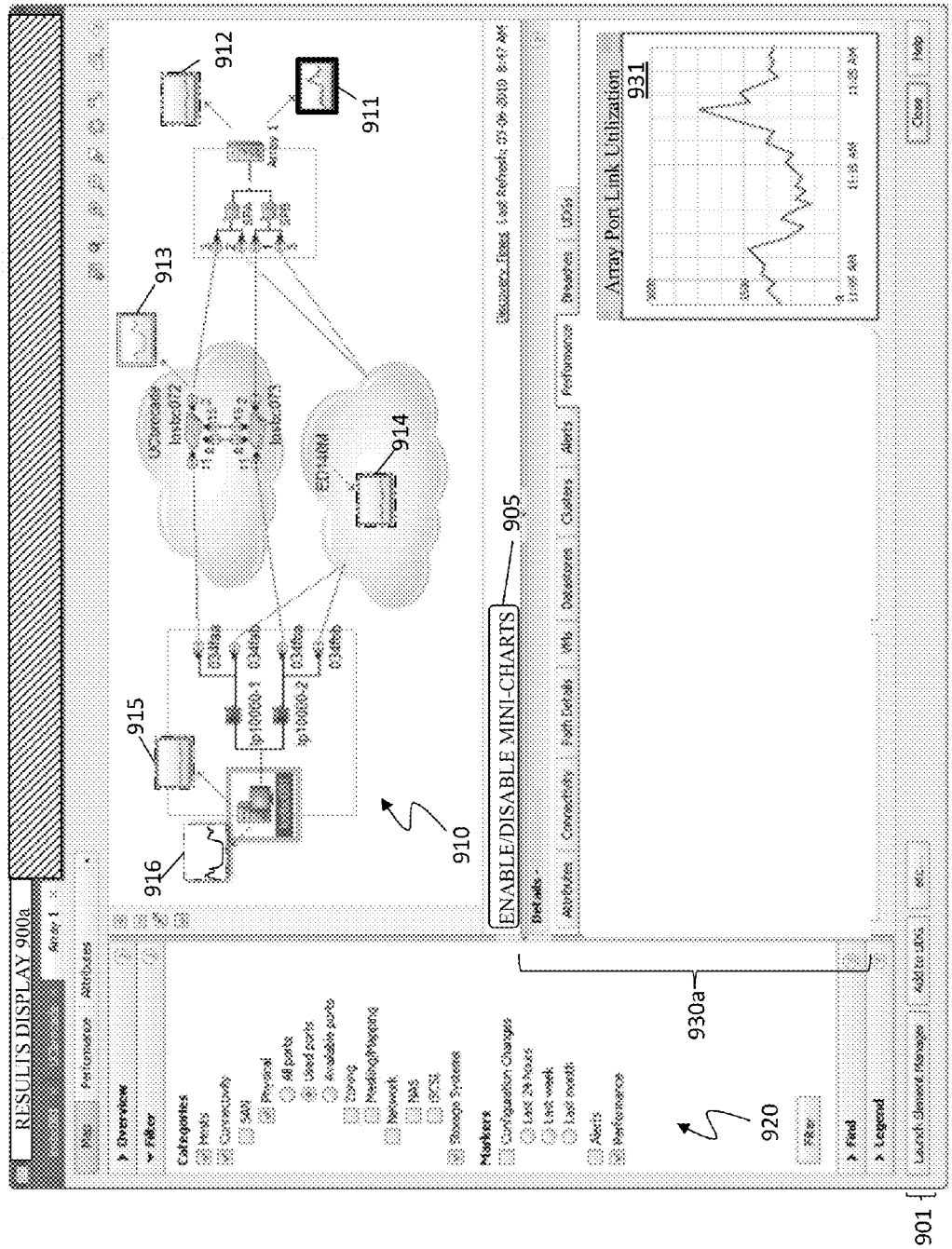
FIG. 17 is a schematic illustration showing, as a results display, display of a full data chart following selection by the user of a mini-chart of the display from FIG. 16 according to an embodiment of the system described herein.

FIG. 17 is a schematic illustration showing, as a results display 900a, display of a full data chart following selection by the user of a mini-chart of the display 900 from FIG. 16 according to an embodiment of the system described herein. The illustrated display 900a shows a details display segment 930a after a user clicks on or otherwise selects the mini-chart 911 shown for the Array 1 object. The details display segment 930a displays, under performance details, the full data chart 931 corresponding to the mini-chart 911. In the illustrated example, chart 931 shows array port link utilization of the Array 1.

Figure 18:
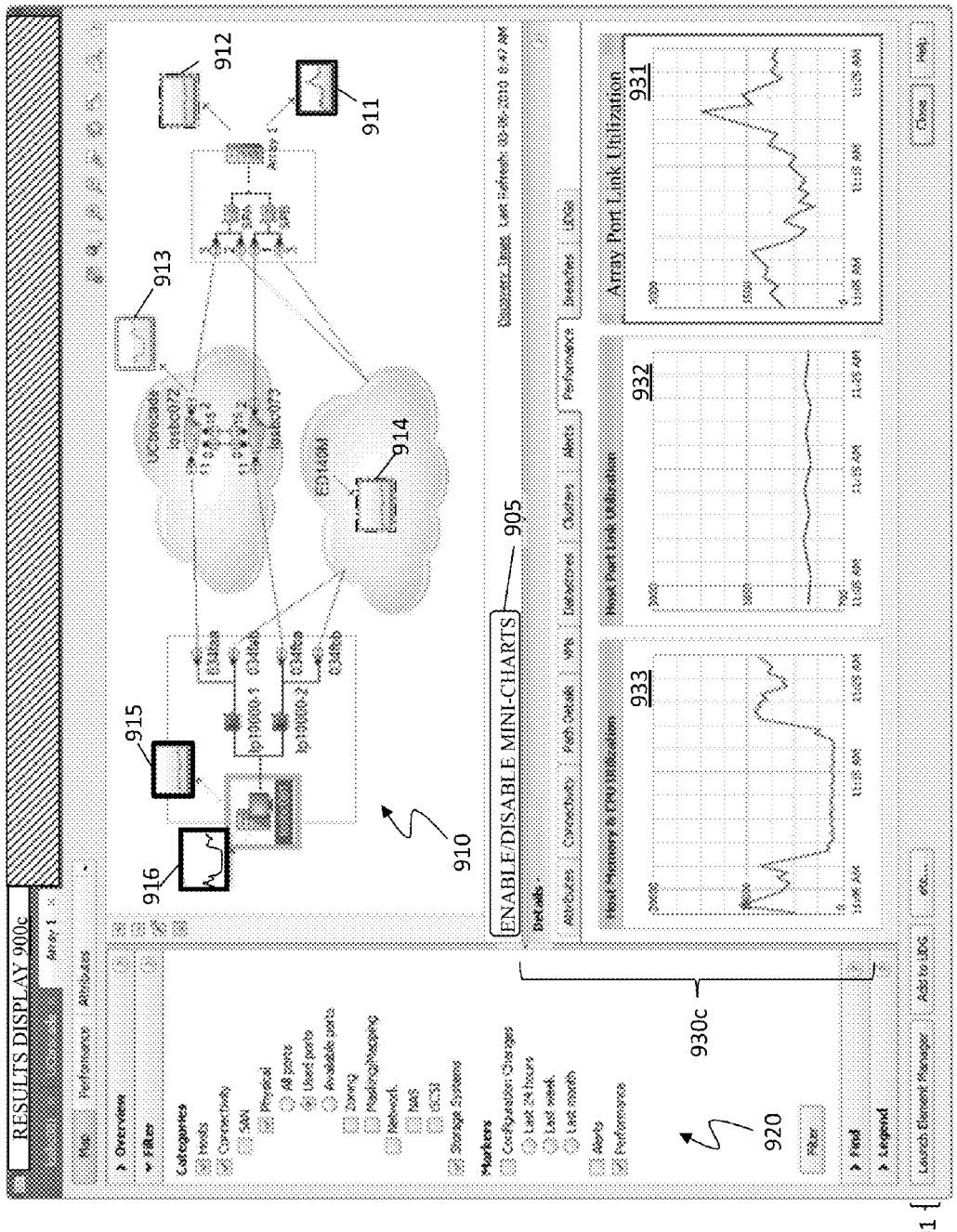
FIG. 18 is a schematic illustration showing, as a results display, display of full data charts following selection by the user of an object of the display from FIG. 16 according to another embodiment of the system described herein.

FIG. 18 is a schematic illustration showing, as a results display 900b, display of full data charts following selection by the user of an object of the display 900 from FIG. 16 according to another embodiment of the system described herein. The illustrated display 900b shows a details display segment 930b after a user clicks on or otherwise selects the application host losbc081, which may display all charts corresponding to available mini-charts (e.g., the mini-charts 915 and 916) for the host losbc081. The details display segment 930a displays, under performance details, the full data charts 932 and 933 corresponding to the mini-charts 915 and 916 for losbc081. In the illustrated example, the chart 932 shows host port link utilization for losbc081 and the chart 933 shows host memory and CPU utilization for losbc081.

Figure 19:
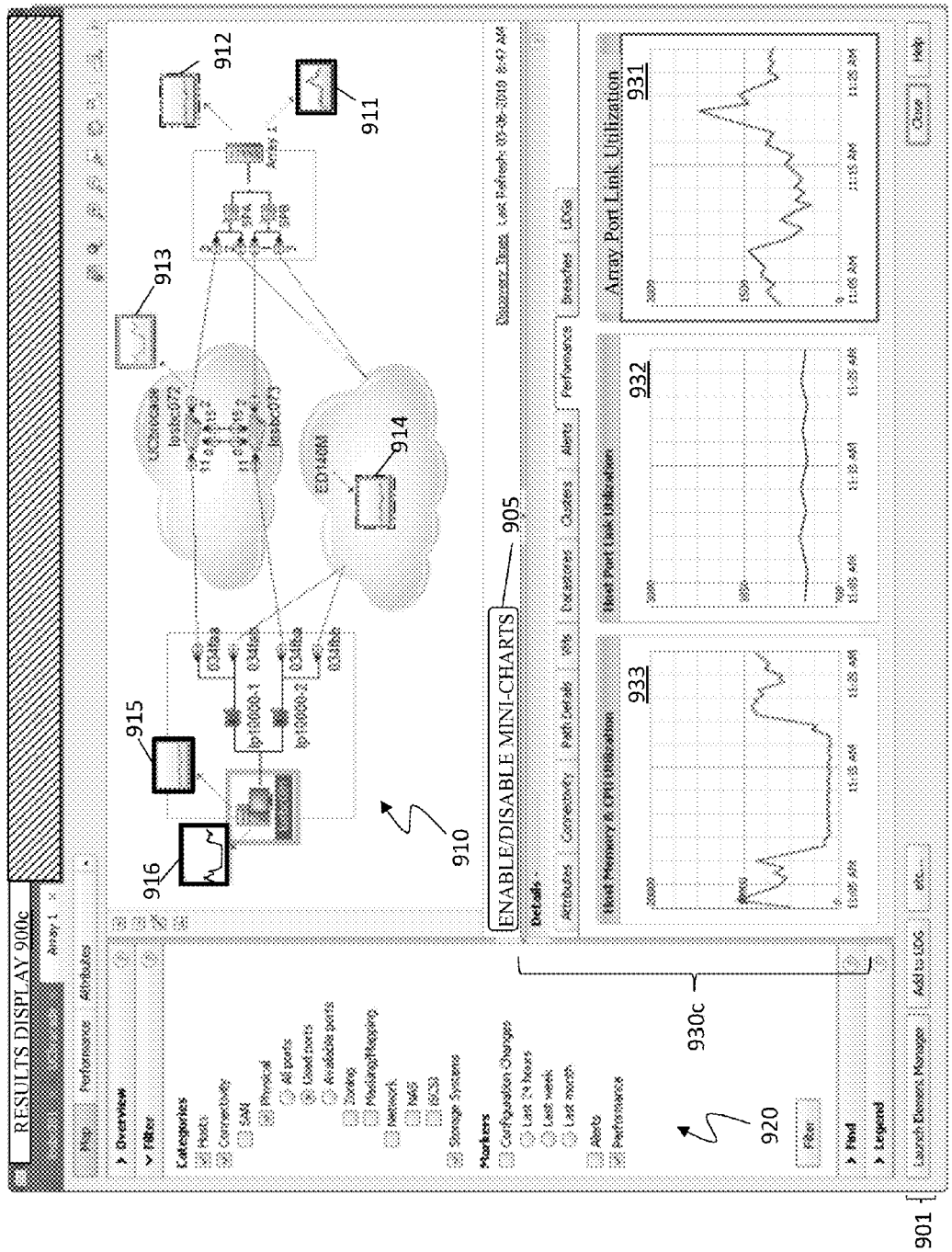
FIG. 19 is a schematic illustration showing, as a results display, display of full data charts following customized selection by the user of elements of the display from FIG. 16 according to another embodiment of the system described herein.

FIG. 19 is a schematic illustration showing, as a results display 900c, display of full data charts following customized selection by the user of elements of the display 900 from FIG. 16 according to another embodiment of the system described herein. The illustrated display 900c shows a details display segment 930c after a user clicks on or otherwise selects mini-charts 911, 915 and 916. The details display segment 930c displays, under performance details, the full data charts 931, 932 and 933 corresponding to the mini-charts 911, 915 and 916 for Array 1 and losbc081. In the illustrated example, the chart 931 shows array port link utilization of the Array 1, the chart 932 shows host port link utilization for losbc081, and the chart 933 shows host memory and CPU utilization for losbc081. It is noted that any desired selection of mini-charts is possible, and the system described herein thereby enables advantageous customization for a user to select and display one or more of any desired mini-charts to aid in problem resolution for I/O paths in the network topology.

Figure 20:
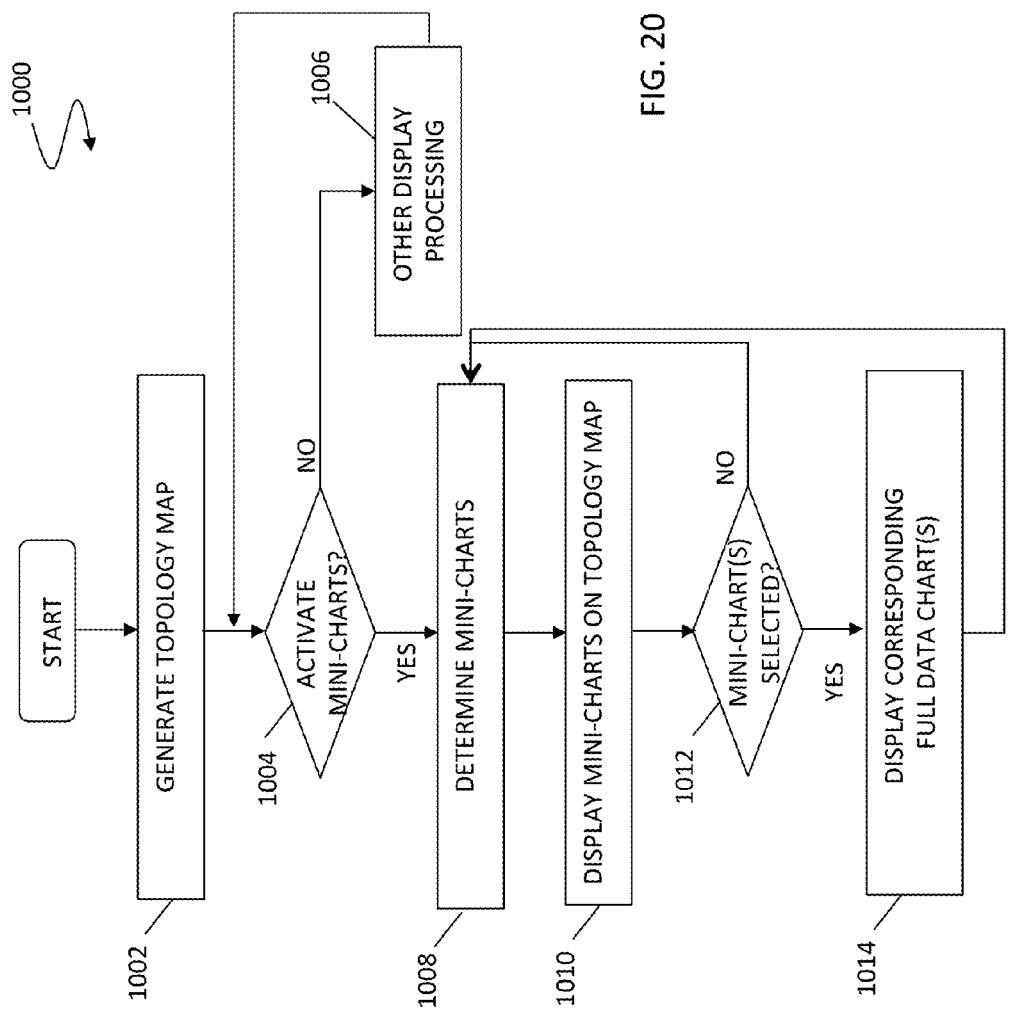
FIG. 20 is a flow diagram showing performance data display processing using mini-charts according to an embodiment of the system described herein.

FIG. 20 is a flow diagram 1000 showing performance data display processing using mini-charts according to an embodiment of the system described herein. At a step 1002, a topology map is generated according to discovery processing performed by the system described herein and based on user configurations and displayed on a results display like that further discussed elsewhere herein. After the step 1002, processing proceeds to a test step 1004 where it is determined whether display of mini-charts has been activated, for example, by action of a user. If, at the test step 1004, it is determined that no mini-charts are to be displayed, then processing proceeds to a step 1006 where other performance data display processing, other than that using mini-charts, is provided. After the step 1006, processing proceeds back to the test step 1004.

If, at the test step 1004, it is determined that display of mini-charts has been activated, then processing proceeds to a step 1008 where mini-charts are determined according to the collected performance data, and determined analytics thereof, for relevant objects of an I/O path. As further discussed elsewhere herein, the mini-charts may be representative of full data charts corresponding to collected performance data for the relevant objects of the I/O path, and may be colored and/or otherwise designated according to criticality thresholds. For example, a threshold may be determined corresponding to port link utilization, that, if reached, causes the mini-chart to appear red, or be otherwise colored or displayed, to indicate a potential problem. In this way, the threshold may be set dynamically over time by automatic action of the system described herein based on the analytics determined for the collected performance data. Specifically, one or more thresholds may be set according to determinations of base line system operations, minimum line system operations and maximum line system operations over a particular period of time. After the step 1008, processing proceeds to a step 1010 where the mini-charts are displayed on the topology map.

After the step 1010, processing proceeds to a test step 1012 where it is determined whether one or more of the mini-charts have been selected by the user. If not, then processing proceeds back to the step 1008 in may what may be part of refresh processing in which the mini-charts are periodically updated. If, at the test step 1012, it is determined that the user has selected one or more of the mini-charts (for example, by a single click of a user on a mini-chart enable button), then processing proceeds to a step 1014 where full data charts corresponding to the selected mini-charts are displayed on the results display. After the step 1014, processing proceeds back to the step 1008 according to the above-noted refresh processing.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for displaying performance data, comprising:
generating a mini-chart, wherein the mini-chart corresponds to a full data chart that displays collected performance data for at least one object of an I/O path;
displaying the mini-chart as an overlay on a topology map showing objects of the I/O path, wherein the mini-chart is displayed in a position on the topology map adjacent to the least one object of the I/O path displayed on the topology map, wherein the mini-chart is a smaller image of the full data chart and presents at least a portion of the performance data collected for the least one object of the I/O path but wherein the mini-chart presents less data than the full data chart, and wherein displaying the mini-chart on the topology map includes assigning a color to the mini-chart on the topology map according to a criticality determination and based on a color coded criticality schema; and
enabling selection of the mini-chart, wherein selection of the mini-chart causes display of the full data chart corresponding to the mini-chart.

2. The method according to claim 1, wherein the criticality determination includes determining whether a threshold is reached corresponding to the collected performance data.

3. The method according to claim 2, wherein the threshold is dynamically set over time based on analytics determined from the collected performance data.

4. The method according to claim 1, further comprising:
generating the topology map; and
displaying the topology map on a display.

5. The method according to claim 1, further comprising:
collecting the performance data for the at least one object of the data path.

6. The method according to claim 1, wherein the mini-chart is one of a plurality of mini-charts that are generated and displayed on the topology map, wherein each of the mini-charts corresponds to each of a plurality of full data charts, and wherein each of the plurality of mini-charts are displayed in a color on the topology map according to the criticality determination and the color coded criticality schema.

7. The method according to claim 6, wherein selection of multiple ones of the plurality of the mini-chart causes display of multiple full data charts at a same time on a display.

8. A non-transitory computer readable medium storing software for displaying performance data, the software comprising:
executable code that generates a mini-chart, wherein the mini-chart corresponds to a full data chart that displays collected performance data for at least one object of an I/O path;
executable code that displays the mini-chart as an overlay on a topology map showing objects of the I/O path, wherein the mini-chart is displayed in a position on the topology map adjacent to the least one object of the I/O path displayed on the topology map, wherein the mini-chart is a smaller image of the full data chart and presents at least a portion of the performance data collected for the least one object of the I/O path but wherein the mini-chart presents less data than the full data chart, and wherein displaying the mini-chart on the topology map includes assigning a color to the mini-chart on the topology map according to a criticality determination and based on a color coded criticality schema; and
executable code that enables selection of the mini-chart, wherein selection of the mini-chart causes display of the full data chart corresponding to the mini-chart.

9. The non-transitory computer readable medium according to claim 8, wherein the criticality determination includes determining whether a threshold is reached corresponding to the collected performance data.

10. The non-transitory computer readable medium according to claim 9, wherein the threshold is dynamically set over time based on analytics determined from the collected performance data.

11. The non-transitory computer readable medium according to claim 8, wherein the software further comprises:
    executable code that generates the topology map; and
    executable code that displays the topology map on a display.

12. The non-transitory computer readable medium according to claim 8, wherein the software further comprises:
    executable code that collects the performance data for the at least one object of the data path.

13. The non-transitory computer readable medium according to claim 8, wherein the mini-chart is one of a plurality of mini-charts that are generated and displayed on the topology map, wherein each of the mini-charts corresponds to each of a plurality of full data charts, and wherein each of the plurality of mini-charts are displayed in a color on the topology map according to the criticality determination and the color coded criticality schema.

14. The non-transitory computer readable medium according to claim 13, wherein selection of multiple ones of the plurality of the mini-chart causes display of multiple full data charts at a same time on a display.

15. A system for displaying performance data, comprising:
    a display; and
    a performance data collection tool that collects performance data for at least one object of an I/O data path; and
    a non-transitory computer readable medium storing software, executed by at least one processor, for displaying performance data, the software comprising:
        executable code that generates a mini-chart, wherein the mini-chart corresponds to a full data chart that displays collected the performance data for the at least one object of the I/O path;
        executable code that displays the mini-chart as an overlay on a topology map showing objects of the I/O path, wherein the mini-chart is displayed in a position on the topology map adjacent to the least one object of the I/O path displayed on the topology map, wherein the mini-chart is a smaller image of the full data chart and presents at least a portion of the performance data collected for the least one object of the I/O path but wherein the mini-chart presents less data than the full data chart, and wherein displaying the mini-chart on the topology map includes assigning a color to the mini-chart on the topology map according to a criticality determination and based on a color coded criticality schema; and
        executable code that enables selection of the mini-chart, wherein selection of the mini-chart causes display of the full data chart corresponding to the mini-chart.

16. The system according to claim 15, wherein the criticality determination includes determining whether a threshold is reached corresponding to the collected performance data.

17. The system according to claim 16, wherein the threshold is dynamically set over time based on analytics determined from the collected performance data.

18. The system according to claim 15, wherein the software further comprises:
    executable code that generates the topology map; and
    executable code that displays the topology map on the display.

19. The system according to claim 15, wherein the mini-chart is one of a plurality of mini-charts that are generated and displayed on the topology map, wherein each of the mini-charts corresponds to each of a plurality of full data charts, and wherein each of the plurality of mini-charts are displayed in a color on the topology map according to the criticality determination and the color coded criticality schema.

20. The system according to claim 19, wherein selection of multiple ones of the plurality of the mini-chart causes display of multiple full data charts at a same time on a display.

\* \* \* \* \*